United States Patent
Park et al.

(10) Patent No.: US 12,069,484 B2
(45) Date of Patent: Aug. 20, 2024

(54) BASE STATION SUPPORTING DYNAMIC SPECTRUM SHARING BETWEEN HETEROGENEOUS NETWORKS AND WIRELESS COMMUNICATION SYSTEM INCLUDING THE SAME

(71) Applicant: SAMSUNG ELECTRONICS CO., LTD., Suwon-si (KR)

(72) Inventors: Jungmin Park, Seoul (KR); Jinho Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 323 days.

(21) Appl. No.: 17/453,905

(22) Filed: Nov. 8, 2021

(65) Prior Publication Data

US 2022/0182843 A1 Jun. 9, 2022

(30) Foreign Application Priority Data

Dec. 3, 2020 (KR) .................. 10-2020-0167663
Mar. 16, 2021 (KR) .................. 10-2021-0034240

(51) Int. Cl.
*H04L 25/02* (2006.01)
*H04L 5/00* (2006.01)
(Continued)

(52) U.S. Cl.
CPC ........... *H04W 16/14* (2013.01); *H04L 5/0048* (2013.01); *H04L 25/0224* (2013.01); *H04L 27/2607* (2013.01); *H04L 5/0005* (2013.01)

(58) Field of Classification Search
CPC ............ H04L 25/0224; H04L 25/0226; H04L 27/2607; H04L 5/0048; H04L 5/0053;
(Continued)

(56) References Cited

U.S. PATENT DOCUMENTS 10,560,297 B1  2/2020  Baldemair et al.
2018/0227918 A1  8/2018  Yun et al.
(Continued)

FOREIGN PATENT DOCUMENTS

CN  111800794  10/2020
WO  2020204786  10/2022

OTHER PUBLICATIONS

Extended European Search Report dated May 11, 2022 in corresponding European Patent Application No. 21207424.9 (21 pages).
(Continued)

*Primary Examiner* — Melvin C Marcelo
*Assistant Examiner* — Natali Pascual Peguero
(74) *Attorney, Agent, or Firm* — F. CHAU & ASSOCIATES, LLC

(57) ABSTRACT

The present disclosure provides a wireless communication system. The wireless communication system includes a base station and a user equipment. The base station is configured to support dynamic spectrum sharing (DSS) between a first network and a second network. The user equipment is configured to communicate with the base station based on the first network. The base station is further configured to puncture allocation of a first reference signal when performing resource allocation on a first control channel in a case where a resource to be allocated to the first reference signal corresponding to the first network overlaps with resource allocated to a second reference signal corresponding to the second network. The user equipment is further configured to receive the first control channel and perform channel estimation for the first network, taking into account the first reference signal that has been punctured.

15 Claims, 26 Drawing Sheets

(51) Int. Cl.
*H04L 27/26* (2006.01)
*H04W 16/14* (2009.01)

(58) Field of Classification Search
CPC ... H04L 5/0005; H04L 5/0007; H04L 5/0051; H04W 16/14
See application file for complete search history.

(56) References Cited

U.S. PATENT DOCUMENTS

| | | |
|---|---|---|
| 2019/0306833 A1 | 10/2019 | Tang et al. |
| 2019/0357264 A1 | 11/2019 | Yi et al. |
| 2020/0053758 A1 | 2/2020 | Hosseini et al. |
| 2020/0154281 A1 | 5/2020 | Muruganathan et al. |
| 2020/0313838 A1 | 10/2020 | Jin et al. |
| 2020/0351987 A1* | 11/2020 | Gheorghiu ............ H04L 5/0007 |

OTHER PUBLICATIONS

ZTE, "Appendix: Discussion on TEI on NR-LTE dynamic spectrum sharing", 3GPP TSG RAN WG1 #98, Aug. 26-30, 2019, 7 pages.
Samsung, "Discussions on Rei-16 TEI", 3GPP TSG RAN WG1 #99, Nov. 18-22, 2019, 5 pages.
Ghadialy Zahid, "5G Dynamic Spectrum Sharing (DSS)", The 3G4G Blog, May 19, 2020, 12 pages.
Vivo, "Discussion on physical DL channel design in unlicensed spectrum", 3GPP TSG RAN WG1 #98, Aug. 26-30, 2019, 10 pages.
Nokia, "TEI16: Enhancements to Dynamic Spectrum Sharing", 3GPP TSG TAN WG1 Meeting #98, Aug. 26-30, 2019, 12 pages.

* cited by examiner

BASE STATION SUPPORTING DYNAMIC SPECTRUM SHARING BETWEEN HETEROGENEOUS NETWORKS AND WIRELESS COMMUNICATION SYSTEM INCLUDING THE SAME

CROSS-REFERENCE TO RELATED APPLICATIONS

This application is based on and claims priority under 35 U.S.C. § 119 to Korean Patent Application Nos. 10-2020-0167663, filed on Dec. 3, 2020 and 10-2021-0034240, filed on Mar. 16, 2021, in the Korean Intellectual Property Office, the disclosures of which are incorporated by reference herein in their entirety.

BACKGROUND

The inventive concept relates to a base station supporting dynamic spectrum sharing (DSS) between heterogeneous networks and a wireless communication system including the same. A base station is a cell tower, or any system used to receive and transmit wireless communication signals.

In some wireless communication systems, DSS technology supports the smooth transition of a frequency band of a long-term evolution (LTE) network to a new radio (NR) network. DSS technology includes various techniques for the mutual and dynamic coexistence of an LTE network and an NR network in the same frequency domain.

For example, a cell reference signal (CRS) of an LTE network may be an always-on signal, and an LTE user equipment (UE) may expect that a CRS is always transmitted from an LTE base station. As a result, when a control channel (or a physical downlink control channel (PDCCH)) of the NR network overlaps with a resource that is allocated to the CRS of the LTE network, a collision of a reference signal in the control channel of the NR network is difficult to avoid. Therefore a base station and a UE may assume that NR network control channel frequency domain allocations do not overlap LTE network CRS frequency domain allocations. Such assumptions may degrade the spectral efficiency wireless communications systems, result in additional latency of communications, etc. Therefore, there is a need in the art for improved wireless communication techniques.

SUMMARY

The inventive concept provides a base station for decreasing the complexity of a user equipment complying with a protocol, which allows the overlap between the time-frequency domain of a control channel of a new radio (NR) network and the time-frequency domain of a cell reference signal (CRS) of a long-term evolution (LTE) network, and a communication system including the base station.

According to an aspect of the inventive concept, there is provided a wireless communication system including a base station configured to support dynamic spectrum sharing (DSS) between a first network and a second network; and a user equipment configured to communicate with the base station based on the first network, wherein the base station is further configured to puncture allocation of a first reference signal when performing resource allocation on a first control channel and when a first resource to be allocated to the first reference signal corresponding to the first network overlaps with a second resource allocated to a second reference signal corresponding to the second network, and wherein the user equipment is further configured to receive the first control channel and perform channel estimation for the first network based on (e.g., taking into account) the allocation of the first reference signal that has been punctured.

According to another aspect of the inventive concept, there is provided a wireless communication system including a base station configured to support DSS between a first network and a second network; and a user equipment configured to communicate with the base station based on the first network, wherein, when the base station performs resource allocation on a control channel, the base station is further configured to adjust a resource allocation offset for a first reference signal such that a first resource to be allocated to the first reference signal corresponding to the first network does not overlap with a second resource allocated to a second reference signal corresponding to the second network, and wherein the user equipment is further configured to receive the control channel and perform channel estimation for the first network using the first reference signal based on the adjusted resource allocation offset.

According to a further aspect of the inventive concept, there is provided an operating method of a base station supporting DSS between a first network and a second network. The operating method includes determining, based on communication settings, whether to allow an overlap between a first resource to be allocated to a first reference signal corresponding to the first network and a second resource allocated to a second reference signal corresponding to the second network; and performing resource allocation on a control channel with a puncture of allocation of the resource to the first reference signal in response to a determination to allow the overlap.

According to a further aspect of the inventive concept, there is provided an operating method of a base station supporting DSS between a first network and a second network. The operating method includes adjusting a resource allocation offset of a first reference signal such that a first resource to be allocated to the first reference signal corresponding to the first network does not overlap with a second resource allocated to a second reference signal corresponding to the second network; and performing resource allocation on a control channel of the first network based on the adjusted resource allocation offset.

According to a further aspect of the inventive concept, there is provided method of wireless communication (e.g., by a user equipment (UE). The method includes identifying a base station is configured to support dynamic spectrum sharing (DSS) between a first network and a second network; determining, based on identifying the base station is configured to support DSS between the first network and the second network, a puncturing pattern for a first reference signal corresponding to the first network; receiving a second reference signal corresponding to the second network based on a second resource allocated to the second reference signal; receiving the first reference signal corresponding to the first network based on a first resource allocated to the first reference signal; and performing channel estimation for the first network based on the determined puncturing pattern, wherein the first resource and the second resource at least partially overlap.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
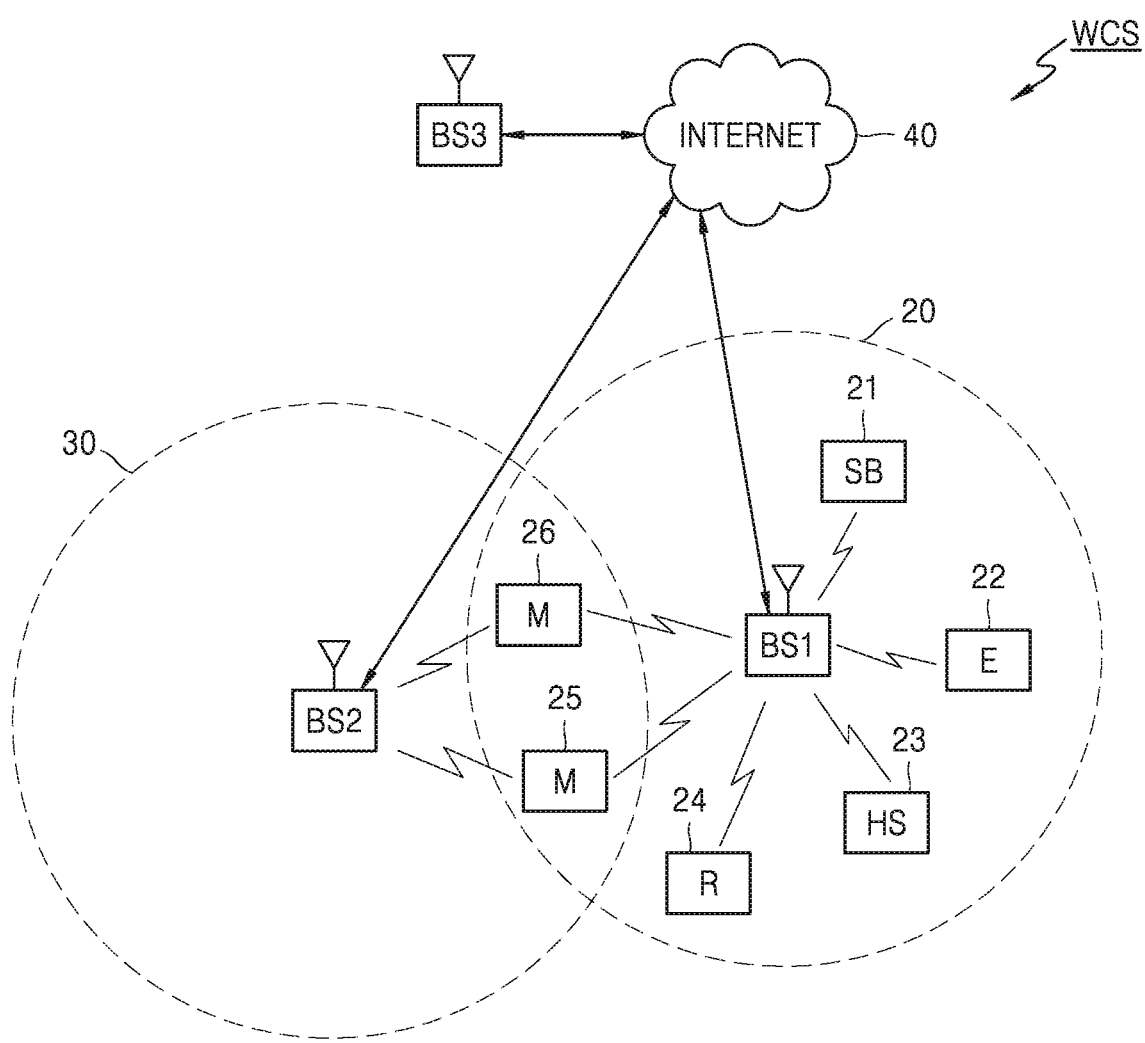
FIG. 1 is a diagram of a wireless communication system according to an example embodiment.

Dynamic spectrum sharing (DSS) technology supports the smooth transition of a frequency band of a long-term evolution (LTE) network to a new radio (NR) network. DSS technology includes various techniques for the mutual and dynamic coexistence of an LTE network and an NR network in the same frequency domain.

In some aspects, DSS technology may benefit from overlapping between the frequency domain of a control channel of an NR network and the frequency domain of a cell reference signal (CRS) of an LTE network. However, in some cases, it may be difficult to avoid collisions between an NR demodulation reference signal (DMRS) and an LTE CRS (e.g., due to LTE user equipment (UE) expectations that a CRS is always transmitted from an LTE base station, etc.). Therefore, there is a need in the art for improved wireless communication techniques such that overlapping signals in a wireless communication network may be efficiently allowed (e.g., such that CRS and DMRS in overlapping frequency domains may be allowed while reducing or eliminating potential collisions).

The present disclosure relates generally to communications between a UE and a base station, which support DSS between heterogeneous networks, and a wireless communication system including the same. More particularly, embodiments of the present disclosure relate to a base station and wireless communication systems that allow an overlap between a NR physical downlink control channel (PDCCH) and an LTE CRS when supporting DSS.

In some embodiments, the present disclosure punctures the DMRS when performing resource allocation on the PDCCH when a resource allocated to a CRS is about to be allocated to a DMRS (e.g., when a DMRS allocated frequency domain resource is about to overlap a frequency domain resource allocated to a CRS).

Dynamic spectrum sharing (DSS) technology of 3rd Generation Partnership Project (3GPP) may support smooth migration of an LTE band to NR. When an NR control channel overlaps with an LTE CRS symbol, a collision between an NR demodulation reference signal (DMRS) and an LTE cell reference signal (CRS) is difficult to avoid. As a result, an overlap between an NR physical downlink control channel (PDCCH) and an LTE CRS is prevented, resulting in degradation of spectral efficiency.

The wireless communication system of the present disclosure includes a base station and a user equipment. The base station is configured to support dynamic spectrum sharing (DSS) between a first network and a second network. The user equipment is configured to communicate with the base station based on the first network. The base station is further configured to puncture allocation of a first reference signal when performing resource allocation on a first control channel in a case where a resource allocated to a second reference signal corresponding to the second network overlaps with a resource to be allocated to the first reference signal corresponding to the first network. The user equipment is further configured to receive the first control channel and perform channel estimation for the first network, taking into account the first reference signal that has been punctured.

One or more aspects of embodiments described herein may be implemented such that a UE may perform channel estimation taking into account one or more punctured DMRS patterns, which may reduce the complexity of channel estimation of the UE. Further, various embodiments may be applied (e.g., base station and/or wireless communication system configurations may be implemented, etc.) such that irregularity of DMRS puncturing patterns may be reduced or minimized.

Hereinafter, embodiments will be described in detail with reference to the accompanying drawings.

FIG. 1 is a diagram of a wireless communication system WCS according to an example embodiment.

Referring to FIG. 1, the wireless communication system WCS may include first through third base stations BS1, BS2, and BS3. The third base station BS3 may communicate with the first and second base stations BS1 and BS2. The third base station BS3 may also communicate with at least one network 40 such as the Internet, a proprietary Internet protocol network, or another data network.

The first base station BS1 may provide wireless broadband access to a plurality of user equipment (UEs) 21 through 26 in a coverage area 20. The UEs 21 through 26 may include the UE 21 that may be located in a small business SB, the UE 22 that may be located in an enterprise E, the UE 23 that may be located in a Wi-Fi hot spot HS, the UE 24 that may be located in a residence R, and the UEs 25 and 26 that may each correspond to a mobile device M such as a cellular phone, a wireless laptop, or a wireless personal digital assistant (PDA). The second base station BS2 may provide wireless broadband access to the UEs 25 and 26 in a coverage area thereof. In an example embodiment, the first through third base stations BS1, BS2, and BS3 may communicate with one another or with the UEs 21 through 26 using new radio (NR), long-term evolution (LTE), LTE-advanced (LTE-A), WiMAX, Wi-Fi, code division multiple access (CDMA), global system for mobile communications (GSM), wireless local area network (WLAN), or other wireless communication technology.

Hereinafter, the first base station BS1 may support NR network-based communication, and the second base station BS2 supports LTE network-based communication. The UEs 25 and 26 may be located in an overlapping area between the coverage area 20 of the first base station BS1 and the coverage area 30 of the second base station BS2, the UE 25 may perform NR network-based communication, and the UE 26 may perform LTE network-based communication. These assumptions are given for clear understanding, and embodiments are not limited thereto.

As described herein, DSS (e.g., DSS technology of 3rd Generation Partnership Project (3GPP)) may support smooth migration of an LTE band to NR. When an NR control channel overlaps with an LTE CRS symbol, a collision between an NR DMRS and an LTE CRS may occur. As a result, in some wireless communication systems, an overlap between an NR PDCCH and an LTE CRS is prevented, resulting in degradation of spectral efficiency.

The wireless communication system of the present disclosure (e.g., at least wireless communication system WCS of FIG. 1) includes a base station (e.g., BS1) and a user equipment (e.g., UE 25). The base station is configured to support DSS between a first network (e.g., an NR network) and a second network (e.g., an LTE network). The user equipment is configured to communicate with the base station based on the first network. The base station is further configured to puncture allocation of a first reference signal (e.g., a DMRS) when performing resource allocation on a first control channel (e.g., a PDCCH) in a case where a resource allocated to a second reference signal (e.g., a CRS) corresponding to the second network overlaps with a resource to be allocated to the first reference signal corresponding to the first network. The user equipment is further configured to receive the first control channel and perform channel estimation for the first network, taking into account the first reference signal (e.g., the DMRS) that has been punctured (e.g., according to a DMRS pattern).

A PDCCH may be transmitted within a control region (e.g., and user equipment may monitor the PDCCH). A Control Channel Element (CCE) may corresponds to a logical allocation unit used for providing a PDCCH at a coding rate based on a wireless channel state. Generally, a reference signal is a signal used to estimate a channel (e.g., for a data signal). A downlink reference signal (e.g., a reference signal for demodulating a physical downlink shared channel (PDSCH)) may include a DMRS and may be transmitted inside a resource block assigned for the PDSCH and the PDCCH transmitted to the UE. In some examples, the network (e.g., the BS1) presents users with DMRS information early on for the initial decoding requirement that low-latency applications need. In the downlink direction, the reference signal may include a CRS and/or a channel state information reference signal (CSI-RS). In some examples, other types of signals may be alternatively used for reference signals described herein.

The first base station BS1 may transmit a control channel (hereinafter, referred to as NR PDCCH), which includes scheduling information regarding data transmitted through a downlink channel or data transmitted through an uplink channel, to the UE 25. The UE 25 may perform NR communication with the first base station BS1 based on the NR PDCCH. The first base station BS1 may support dynamic spectrum sharing (DSS) between an NR network supported by the first base station BS1 and an LTE network supported by the second base station BS2, and the communication frequency band of the first base station BS1 may partially overlap with that of the second base station BS2. The first base station BS1 may control an overlap pattern between a time-frequency domain allocated the NR PDCCH and a time-frequency domain allocated a cell reference signal (CRS) such that the complexity of the UE 25 related to channel estimation may be reduced. Hereinafter, resource allocation performed by a base station may be referred to as resource mapping, and resource allocation for a reference signal or a PDCCH may indicate allocation of a resource element to a symbol included in the reference signal or the PDCCH, wherein the resource element is a minimum unit of a resource. An embodiment of the overlap of the NR PDCCH of the first base station BS1 will be described with reference to FIGS. 8, 10A, and 10B.

In an example embodiment, the first base station BS1 may allow the overlap between a resource to be allocated to a first reference signal corresponding to an NR network and a resource that has been allocated to a second reference signal corresponding to an LTE network. Then, when the resources to be allocated to the first reference signal overlap with the resources that have been allocated to the second reference signal, the first base station B Si may prevent the collision between the first reference signal and the second reference signal by puncturing allocation for the first reference signal. In an example embodiment, the first reference signal may include a demodulation reference signal (DMRS), and the second reference signal may include a CRS. The second base station BS2 may allocate certain resources to the second reference signal and transmit the second reference signal to the UE 26. The UE 26 may estimate a channel between the second base station BS2 and the UE 26 using the second reference signal.

In an example embodiment, the UE 25 may receive an NR PDCCH from the first base station BS1 and perform channel estimation for an NR network taking into account the first reference signal that has been punctured. Embodiments of the channel estimation of the UE 25 will be described with reference to FIGS. 11, 12A, and 12B.

In an example embodiment, the first base station BS1 may not allow the overlap between resources to be allocated to a first reference signal corresponding to an NR network and resources that have been allocated to a second reference signal. In some embodiments, the first base station BS1 may determine whether the overlap between the resources to be allocated to the first reference signal and the resources that have been allocated to the second reference signal corresponding to an LTE network is allowable, based on the communication settings of the first base station BS1 with respect to the UE 25 or the communication settings of the second base station BS2 for the second reference signal. For example, the communication settings may be about an allocation range for the NR PDCCH of the first base station BS1 or about the number of second reference signal rate matching patterns, which may be applied to a frequency domain corresponding to a certain carrier of the second base station BS2. This will be described with reference to FIGS. 15A and 15B.

In an example embodiment, when the overlap between the resources to be allocated to the first reference signal and the resources that have been allocated to the second reference signal is determined not be allowable, the first base station BS1 may allocate the first reference signal resources different from the resources allocated to the second reference signal.

In an example embodiment, when the first base station BS1 allocates resources to the NR PDCCH, the first base station BS1 may adjust a resource allocation offset for the first reference signal such that the resources allocated to the second reference signal do not overlap with the resources to be allocated to the first reference signal. The first base station BS1 may also allocate the resources to the NR PDCCH such that the resources to be allocated to the first reference signal shift in a time axis not to overlap with the resources allocated to the second reference signal. Embodiments relating to this will be described with reference to FIGS. 12A through 13.

Figure 2:
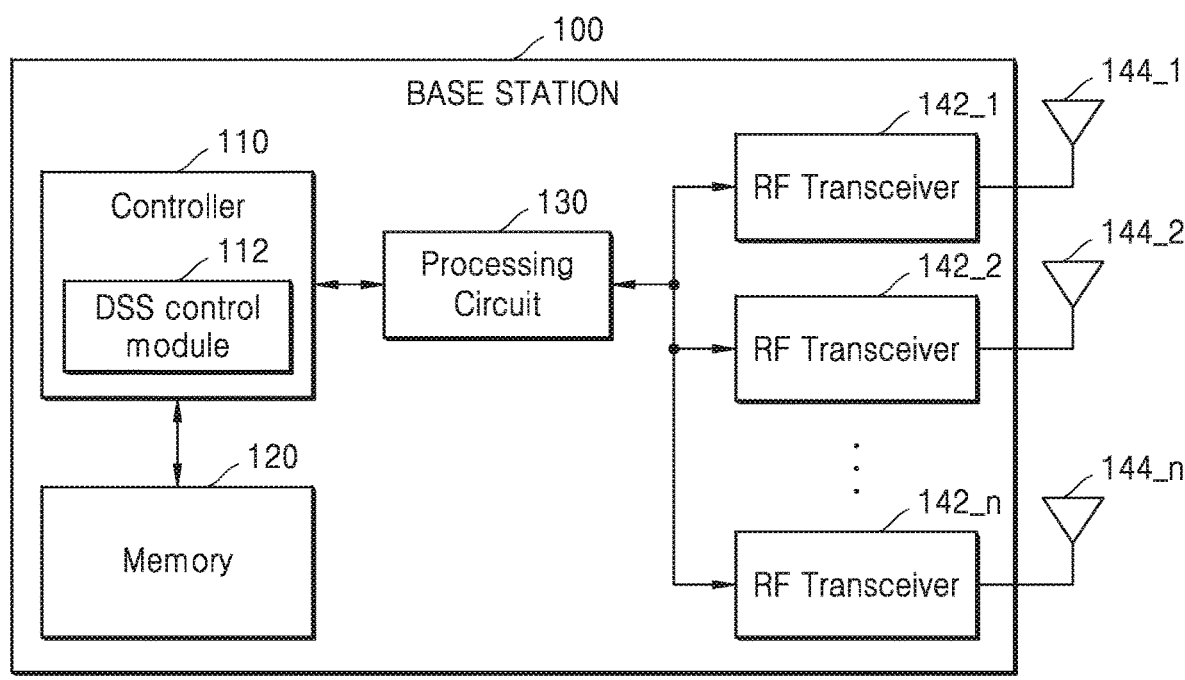
FIG. 2 is a block diagram of an implementation of a base station according to an example embodiment.

FIG. 2 is a block diagram of an implementation of a base station 100 according to an example embodiment. The implementation of the base station 100 is just an example, and thus, embodiments are not limited thereto. The implementation of the base station 100 may be applied to the first base station BS1 in FIG. 1.

Referring to FIG. 2, the base station 100 may include a controller 110, a memory 120, a processing circuit 130, a plurality of radio frequency (RF) transceivers 142_1 through 142_n, and a plurality of antennas 144_1 through 144_n. Each of the RF transceivers 142_1 through 142_n may receive an RF signal from a UE in a network through a corresponding one of the antennas 144_1 through 144_n. Each of the RF transceivers 142_1 through 142_n may generate an intermediate frequency (IF) or a baseband signal by performing frequency down-conversion on the received RF signal. The processing circuit 130 may generate data signals by filtering, decoding, and/or digitizing IF or baseband signals. The controller 110 may additionally process the data signals.

The processing circuit 130 may receive data signals from the controller 110. The processing circuit 130 may encode, multiplex, and/or analogize the data signals. The RF transceivers 142_1 through 142_n may perform frequency up-conversion on IF or baseband signals output from the processing circuit 130 and transmit RF signals to the antennas 144_1 through 144_n.

In an example embodiment, the controller 110 may perform general communication control operations of the base station 100 for NR network-based communication and may include a DSS control module 112 for resource allocation to an NR PDCCH during DSS.

In an example embodiment, a time-frequency domain allocated to an NR PDCCH may overlap with a time-frequency domain allocated to a CRS of an LTE network. As a result, the DSS control module 112 may determine resources allocated to the NR PDCCH and control the puncturing of allocation for a first reference signal when resources to be allocated to the first reference signal overlap with resources allocated to a second reference signal.

In an example embodiment, a time-frequency domain allocated to an NR PDCCH may overlap with a time-frequency domain allocated to a CRS of an LTE network. As a result, the DSS control module 112 may determine resources allocated to the NR PDCCH and adjust a resource allocation offset for a first reference signal such that resources to be allocated to the first reference signal do not overlap with resources allocated to a second reference signal. The DSS control module 112 may prevent the resources to be allocated to the first reference signal from overlapping with the resources allocated to the second reference signal by shifting the resources to be allocated to the first reference signal in a time axis.

In an example embodiment, a time-frequency domain allocated to an NR PDCCH may overlap with a time-frequency domain allocated to a CRS of an LTE network. As a result, DSS control module 112 may determine whether the overlap between resources to be allocated to a first reference signal and resources allocated to a second reference signal is allowable, based on communication settings. In other words, the DSS control module 112 may not allow the overlap between the resources to be allocated to the first reference signal and the resources allocated to the second reference signal in communication settings that increase the irregularity of punctured first reference signal patterns. When the overlap is determined to be allowable, the DSS control module 112 may puncture allocation for the first reference signal when the resources to be allocated to the first reference signal overlap with the resources allocated to the second reference signal. When the overlap is determined not to be allowable, the DSS control module 112 may allocate the first reference signal resources different from the resources allocated to the second reference signal.

In an example embodiment, the DSS control module 112 may allocate resources to an NR PDCCH based on UE performance received from a UE. For example, UE performance may include a supportable number of punctured first reference signal patterns. The DSS control module 112 may allocate resources to the NR PDCCH, considering the supportable count of punctured first reference signal patterns. For example, when the supportable count of punctured first reference signal patterns is three, the DSS control module 112 may allocate resources to the NR PDCCH such that at most three punctured first reference signal patterns are included in a time-frequency domain allocated to the NR PDCCH. In an example embodiment, the supportable count of punctured first reference signal patterns may refer to an available number of changes in punctured first reference signal patterns. This will be described with reference to FIGS. 17A and 17B.

The controller 110 may execute a program and/or a process stored in the memory 120 to perform general communication control of the base station 100. In an example embodiment, the DSS control module 112 may be stored in the memory 120 as program code, and the controller 110 perform the operation of the DSS control module 112 by accessing the memory 120 and executing the program code.

Figure 3:
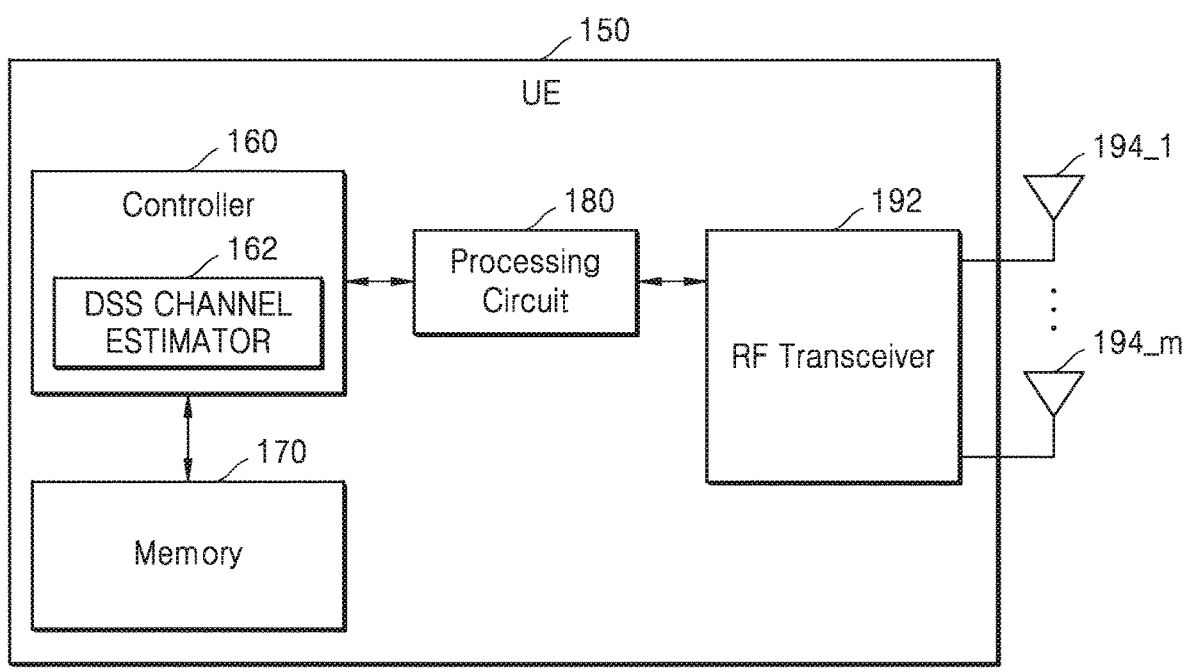
FIG. 3 is a block diagram of an implementation of a user equipment (UE) according to an example embodiment.

FIG. 3 is a block diagram of an implementation of a UE 150 according to an example embodiment. The implementation of the UE 150 is just an example, and embodiments are not limited thereto. The implementation of the UE 150 may be applied to the UE 25 in FIG. 1.

Referring to FIG. 3, the UE 150 may include a controller 160, a memory 170, a processing circuit 180, an RF transceiver 192, and a plurality of antennas 194_1 through 194_m. Although not shown, the UE 150 may further include an element such as a speaker, an input/output interface, a touch screen, or a display.

The RF transceiver 192 may receive RF signals from a base station through the antennas 194_1 through 194_m. The RF transceiver 192 may down-convert the RF signals to IF or baseband signals. The processing circuit 180 may generate data signals by filtering, decoding, and/or digitizing IF or baseband signals. The controller 160 may additionally process the data signals.

The processing circuit 180 may receive data signals from the controller 160. The processing circuit 180 may encode, multiplex, and/or analogize the data signals. The RF transceiver 192 may perform frequency up-conversion on IF or baseband signals output from the processing circuit 180 and transmit RF signals to the antennas 194_1 through 194_m.

In an example embodiment, the controller 160 may perform general communication control operations for NR network-based communication and may include a DSS channel estimator 162 for downlink channel estimation in DSS.

In an example embodiment, the DSS channel estimator 162 may estimate a channel (or a downlink channel) carrying an NR PDCCH, taking into account a punctured first reference signal. For example, the DSS channel estimator 162 may estimate a channel using a punctured first reference signal pattern in a portion of a time-frequency domain and estimate a channel using an unpunctured first reference signal pattern in another portion of the time-frequency domain. For example, the DSS channel estimator 162 may estimate a channel by reflecting a punctured first reference signal pattern in a portion of a time-frequency domain in another portion of the time-frequency domain to increase the regularity of first reference signals.

In an example embodiment, the DSS channel estimator 162 may estimate a channel carrying an NR PDCCH based on the communication settings of a base station. As described above with reference to FIG. 2, the base station may not allow the overlap between resources to be allocated to a first reference signal and resources allocated to a second reference signal in the communication settings with a high irregularity of punctured first reference signal patterns, and accordingly, the DSS channel estimator 162 may receive information about the communication settings from the base station to identify whether the overlap is allowed. The DSS channel estimator 162 may identify whether the first reference signal is punctured or not based on the information about the communication settings and perform adaptive channel estimation according to an identification result.

In an example embodiment, the controller 160 may control a supportable count of punctured first reference signal patterns to be reported to a base station communicating with the UE 150, wherein the supportable count of punctured first reference signal patterns is related with the performance of the UE 150. The higher the performance of the UE 150, the supportable count of punctured first reference signal patterns may increase.

The controller 160 may execute a program and/or a process stored in the memory 170 to perform general communication control operations of the UE 150. In an example embodiment, the DSS channel estimator 162 may be stored in the memory 170 as program code, and the controller 160 may perform the operations of the DSS channel estimator 162 by accessing the memory 170 and executing the program code.

Figure 4:
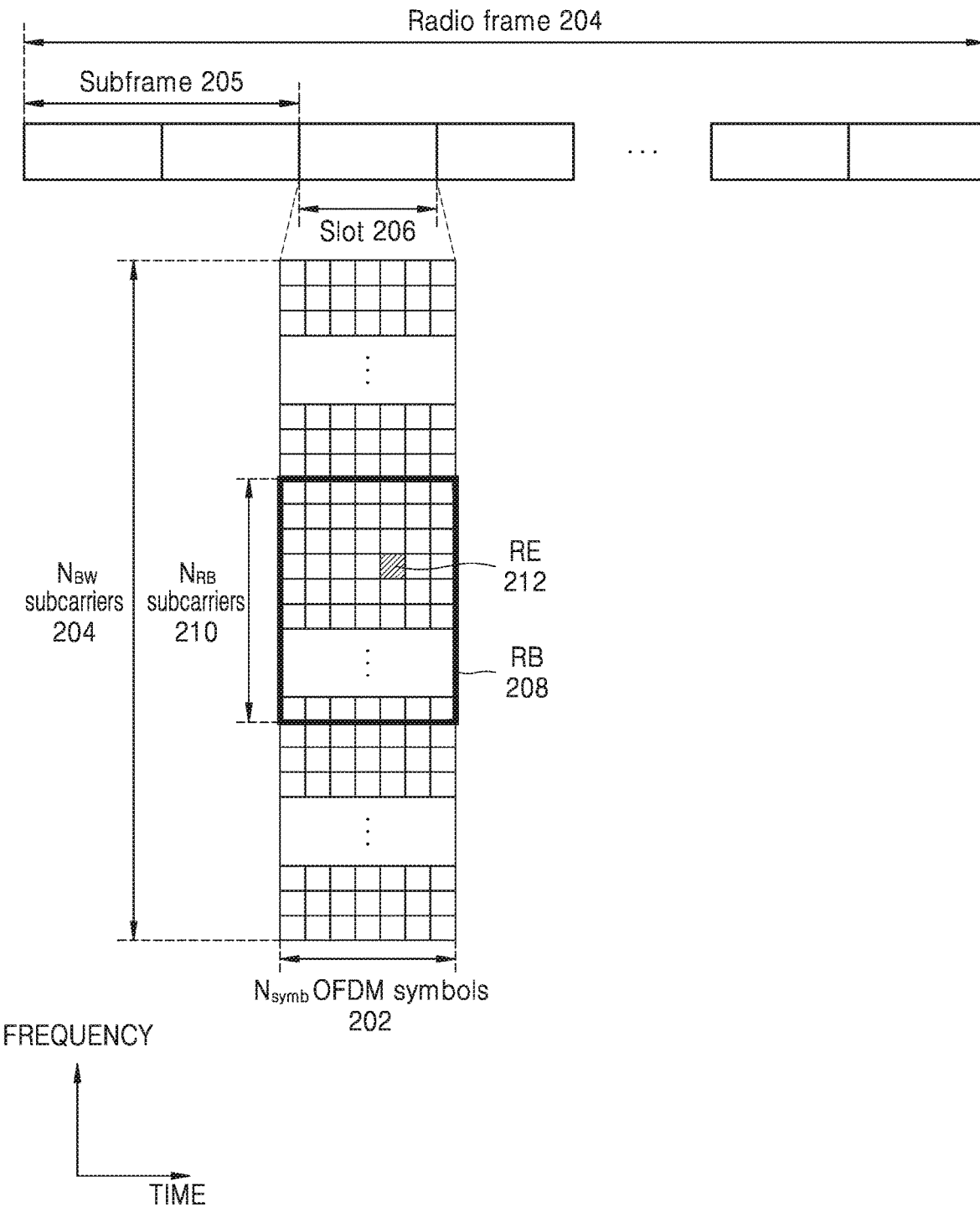
FIG. 4 is a diagram illustrating the basic structure of a time-frequency domain in a wireless communication system.
Figure 5:
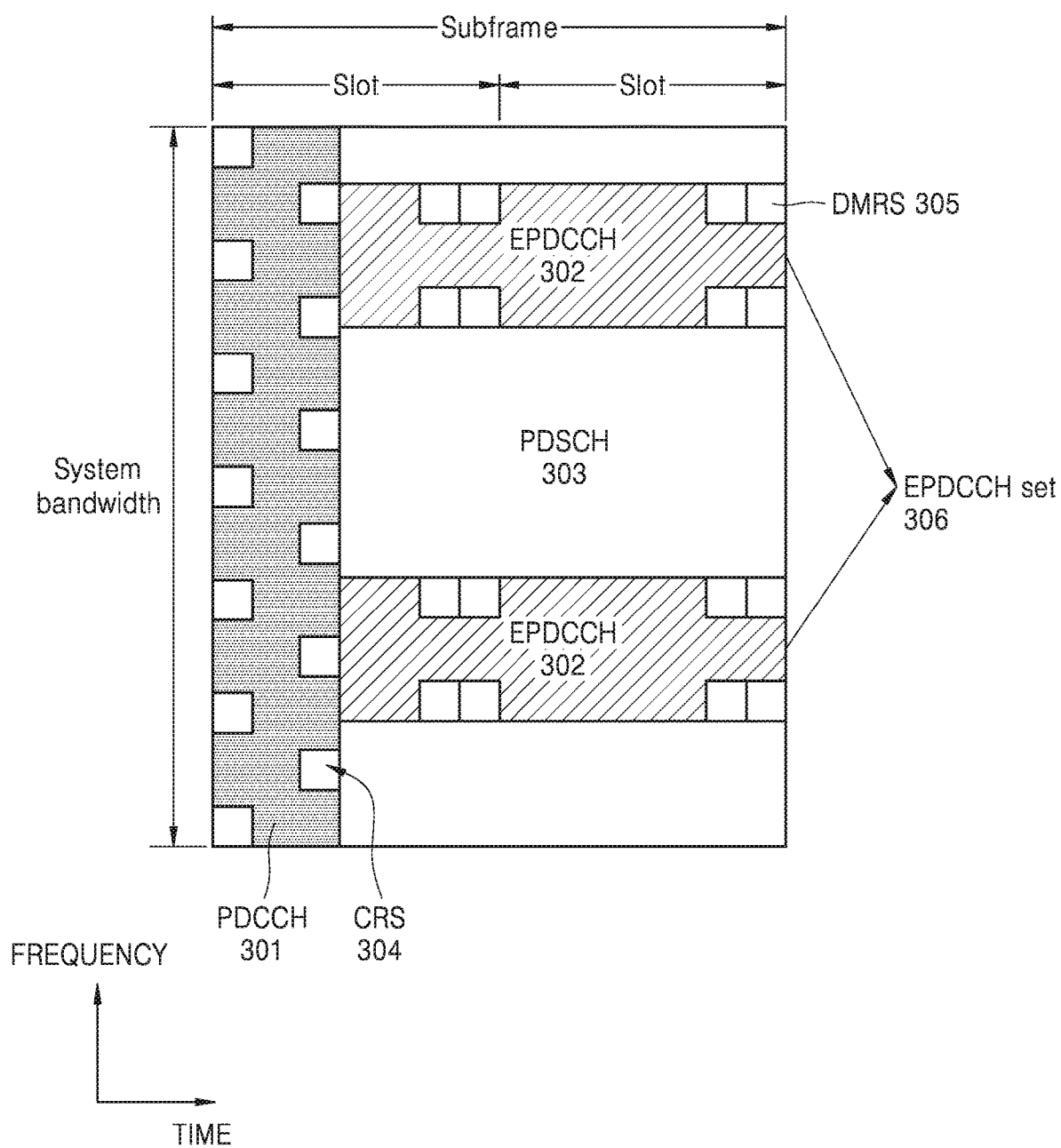
FIG. 5 is a diagram for describing a cell reference signal (CRS) in a wireless communication system supporting long-term evolution (LTE)
Figure 6A:
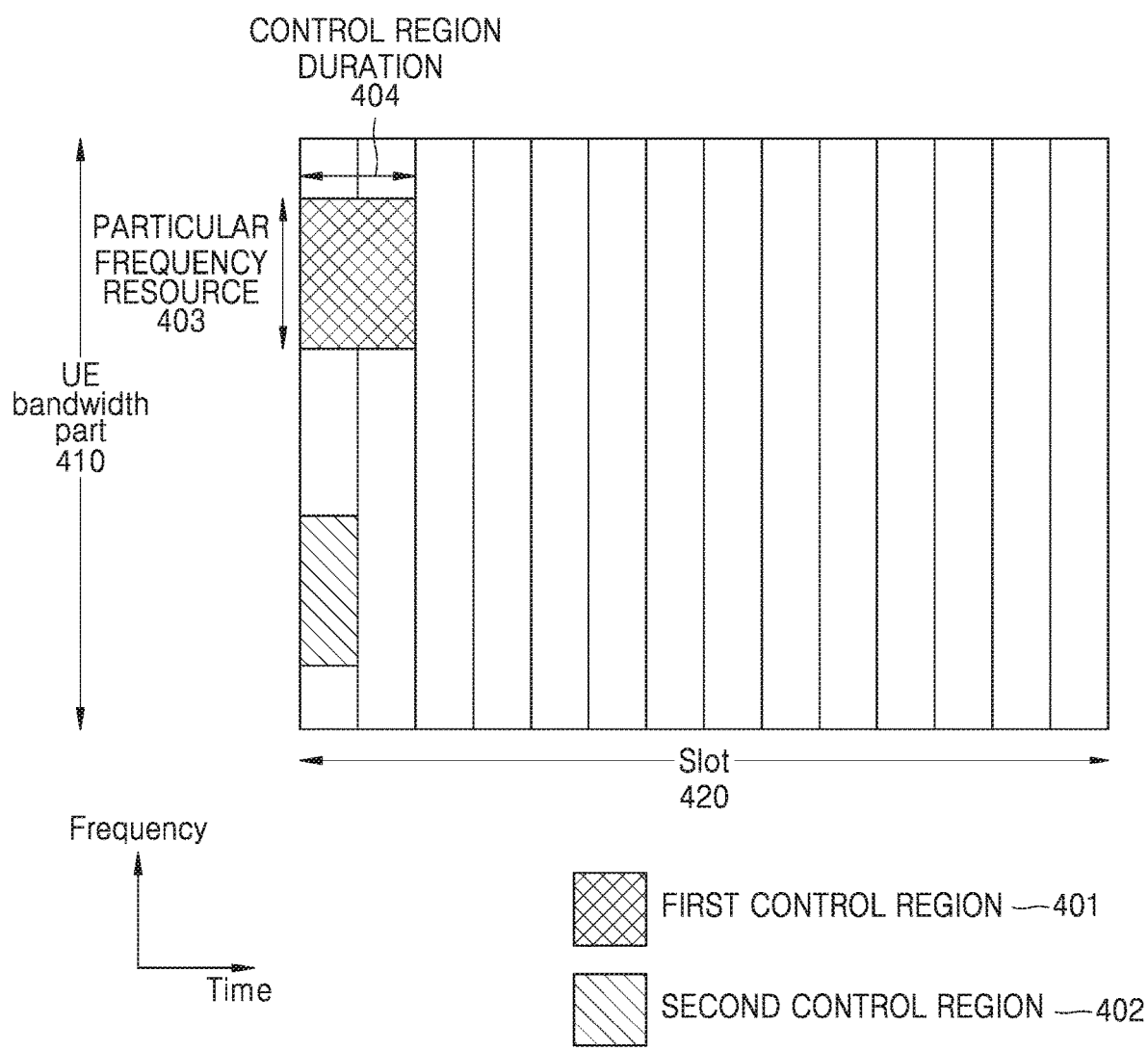
FIGS. 6A and 6B are diagrams illustrating a physical downlink control channel (PDCCH) in a wireless communication system supporting new radio (NR)
Figure 6B:
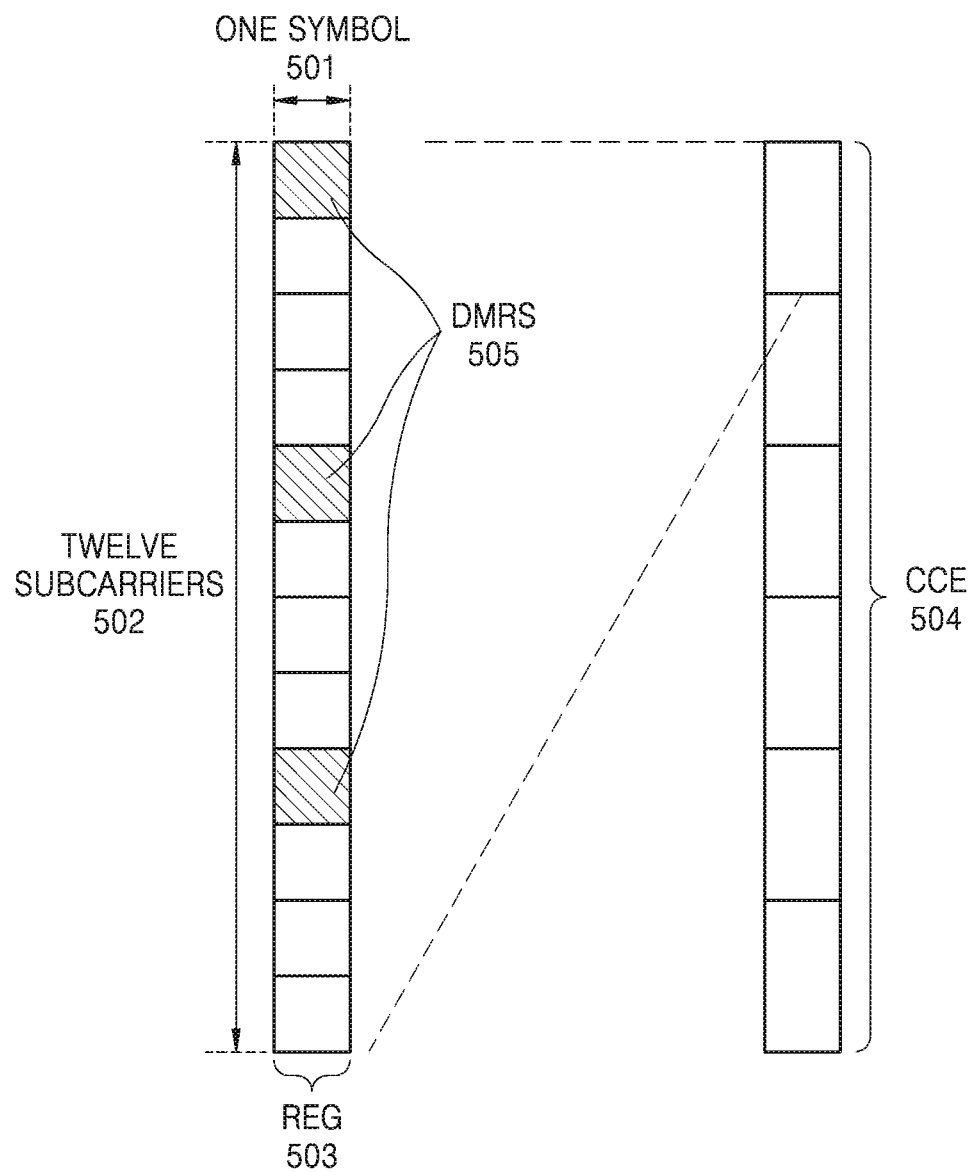

FIG. 4 is a diagram illustrating the basic structure of a time-frequency domain in a wireless communication system; FIG. 5 is a diagram for describing a CRS in a wireless communication system supporting LTE; and FIGS. 6A and 6B are diagrams illustrating a PDCCH in a wireless communication system supporting NR.

Referring to FIG. 4, the horizontal axis is a time domain and the vertical axis is a frequency domain. A minimum transmission unit in the time domain is an orthogonal frequency division multiplexing (OFDM) symbol, $N_{symb}$ OFDM symbols 202 may constitute a single slot 206, and two slots may constitute a single subframe 205. For example, the length of the slot 206 may be 0.5 ms, and the length of the subframe 205 may be 1.0 ms. A radio frame 214 may correspond to a time-domain unit including ten subframes 205.

A minimum transmission unit in the frequency domain is a subcarrier, and a total system transmission bandwidth may include $N_{BW}$ subcarriers 204. A basic unit of a resource in the time-frequency domain may be a resource element (RE) 212 and may be represented by an OFDM symbol index and a subcarrier index. A resource block (RB) 208 may be defined by $N_{symb}$ OFDM symbols 202 consecutive in the time domain and $N_{RB}$ subcarriers 210 consecutive in the frequency domain. Accordingly, one RB 208 may include $N_{symb}*N_{RB}$ REs 212. An RB pair may correspond to a unit of two RBs 208 consecutive along the time axis and include $2N_{symb}*N_{RB}$ REs 212

An NR PDCCH may be transmitted from a base station to a wireless communication device in a wireless communication system through resources in the time-frequency domain shown in FIG. 4, and downlink control information (DCI) may be transmitted through the NR PDCCH. DCI may include downlink scheduling assignment-related information including physical downlink shared channel (PDSCH) resource designation, transmission format, hybrid automatic repeat request (HARQ) information, and spatial multiplexing-related control information.

Referring to FIG. 5, a PDCCH (or an LTE PDCCH) 301 may be time-multiplexed with a PDSCH (or an LTE PDSCH) 303 (a data transmission channel) and transmitted over an entire system bandwidth. The region of the PDCCH 301 may be represented with the number of OFDM symbols, which may be indicated to a UE via a control format indicator (CFI) transmitted through a physical control format indicator channel (PCFICH). When the PDCCH 301 is allocated to an OFDM symbol in a front portion of a subframe, the UE may decode downlink scheduling assignment as fast as possible. Because one PDCCH carries one piece of DCI and multiple UEs may be simultaneously scheduled for a downlink and an uplink, a plurality of PDCCHs may be simultaneously transmitted in each UE.

A CRS 304 is used as a reference signal for decoding of the PDCCH 301. The CRS 304 may be transmitted for each subframe over the entire band, and scrambling and resource mapping may vary with a base station identity (ID). The number of CRS ports may be implicitly determined by a UE from decoding of a physical broadcast channel (PBCH).

Resource allocation of the PDCCH 301 is based on a control-channel element (CCE). One CCE is constituted of nine RE groups (REGs), i.e., a total of 36 REs. The number of CCEs used for a particular PDCCH 301 may be 1, 2, 4, or 8 and may vary with a channel coding rate of a DCI payload. As such, different numbers of CCEs may be used to realize the link adaptation of the PDCCH 301.

An enhanced PDCCH (EPDCCH) 302 may be frequency-multiplexed with the PDSCH 303 and then transmitted. A base station may appropriately allocate the resources of the EPDCCH 302 and the PDSCH 303 via scheduling, thereby effectively supporting coexistence with data transmission for a UE.

A plurality of EPDCCHs 302 may constitute a single EPDCCH set 306, and the EPDCCH set 306 may be allocated per physical RB (PRB) pair. Location information of the EPDCCH set 306 may be set UE-specifically and signaled via remote radio control (RRC). Up to two EPDCCH sets 306 may be set for each UE, and one EPDCCH set 306 may be multiplexed and simultaneously set for different UEs.

The EPDCCH 302 uses a DMRS 305 as a reference signal for decoding. The DMRS 305 of the EPDCCH 302 uses the same pattern as the PDSCH 303. However, unlike the PDSCH 303, the DMRS 305 of the EPDCCH 302 may support up to four antenna ports. The DMRS 305 of the EPDCCH 302 may be transmitted in the PRB in which the EPDCCH 302 is transmitted.

Referring to FIG. 6A, a UE bandwidth part 410 is set on the frequency axis, and two control regions (i.e., a first control region 401 and a second control region 402) are set in one slot 420 on the time axis. The first control region 401 and the second control region 402 may be set to a particular frequency resource 403 in the UE bandwidth part 410 on the frequency axis. Each of the first control region 401 and the second control region 402 may be referred to as a control resource set (CORESET), and an NR PDCCH may be allocated to at least one of the first control region 401 and the second control region 402.

One or more OFDM symbols may be set on the time axis, which may be defined as a control region duration 404. In an example shown in FIG. 6A, the first control region 401 is set to a control region duration corresponding to two symbols, and the second control region 402 is set to a control region duration corresponding to one symbol.

A control region in NR may be set via higher layer signaling (e.g., system information, master information block (MIB), or radio resource control (RRC) signaling) from a base station to a UE. Setting a control region for a UE may mean that the UE is provided with information such as a control region ID, a frequency-axis location of a control region, and a control region duration.

According to an example embodiment, to reduce a load on a UE performing channel estimation taking into account a punctured first reference signal, a base station may adjust at least one selected from the particular frequency resource 403 and the control region duration 404 of a control region, which may be allocated with an NR PDCCH. This will be described with reference to FIGS. 8, 10A, and 10B.

Referring to FIG. 6B, an REG 503 may correspond to a basic unit of a resource of an NR PDCCH and may be defined by one OFDM symbol 501 on the time axis and one PRB, i.e., twelve subcarriers 502, on the frequency axis. A base station may form an NR PDCCH allocation unit by joining REGs 503.

As shown in FIG. 6B, if a basic unit in which an NR PDCCH is allocated is a CCE 504, the CCE 504 may be constituted of a plurality of REGs 503. For example, when one REG 503 is constituted of twelve REs and one CCE 504 is constituted of six REGs 503, one CCE 504 may be constituted of 72 REs. When a downlink control region is set, the downlink control region may be constituted of a plurality of CCEs 504, and an NR PDCCH may be mapped to one or more CCEs 504 according to an aggregation level in the downlink control region and then transmitted.

The basic unit, i.e., an REG 503, of the NR PDCCH in FIG. 6B may include a resource, to which DCI is mapped, and a region, to which a DMRS 505 is mapped, wherein the DMRS 505 is a reference signal for decoding the resource. For example, three DMRSs 505 may be transmitted in one REG 503. The number of CCEs used for the transmission of a PDCCH may be 1, 2, 4, 8, or 16 according to the aggregation level, and different numbers of CCEs may be used to realize the link adaptation of the PDCCH. For example, when the aggregation level is L, one PDCCH may be transmitted through L CCEs.

Hereinafter, the overlap between a resource allocated to a CRS 304 of an LTE PDCCH in FIG. 5 and a resource to be allocated to a DMRS 505 of an NR PDCCH in FIG. 6B may be allowed. However, this is just an example, and embodiments are not limited thereto. Embodiments may also be applied to the relation between a random signal of an NR PDCCH and a random signal in LTE and to other different types of networks.

For example, one technique of puncturing involves not transmitting certain bits (e.g., an a puncturing pattern may refer to a pattern of certain bits that are not transmitted for, for example, a DMRS). In some examples, a technique of puncturing involves puncturing a symbol (e.g., to the level at which the data may be reconstructed) to reduce the power consumption of the transmission (e.g., of the DMRS transmission). In some implementations, an encoder (e.g., a base station encoder) may include puncturing units that respectively perform puncturing on data encoded by the encoder. A puncturing pattern may generally refer to any pattern by which encoded data is punctured (e.g., in units of bits, symbol, etc.). In some examples, a base station may generate a control signal including information about a puncturing pattern, and a data converter (or puncturing unit(s)) may puncture first data (e.g., an original DMRS) based on the control signal to generate second data (e.g., punctured DRMS).

Figure 7A:
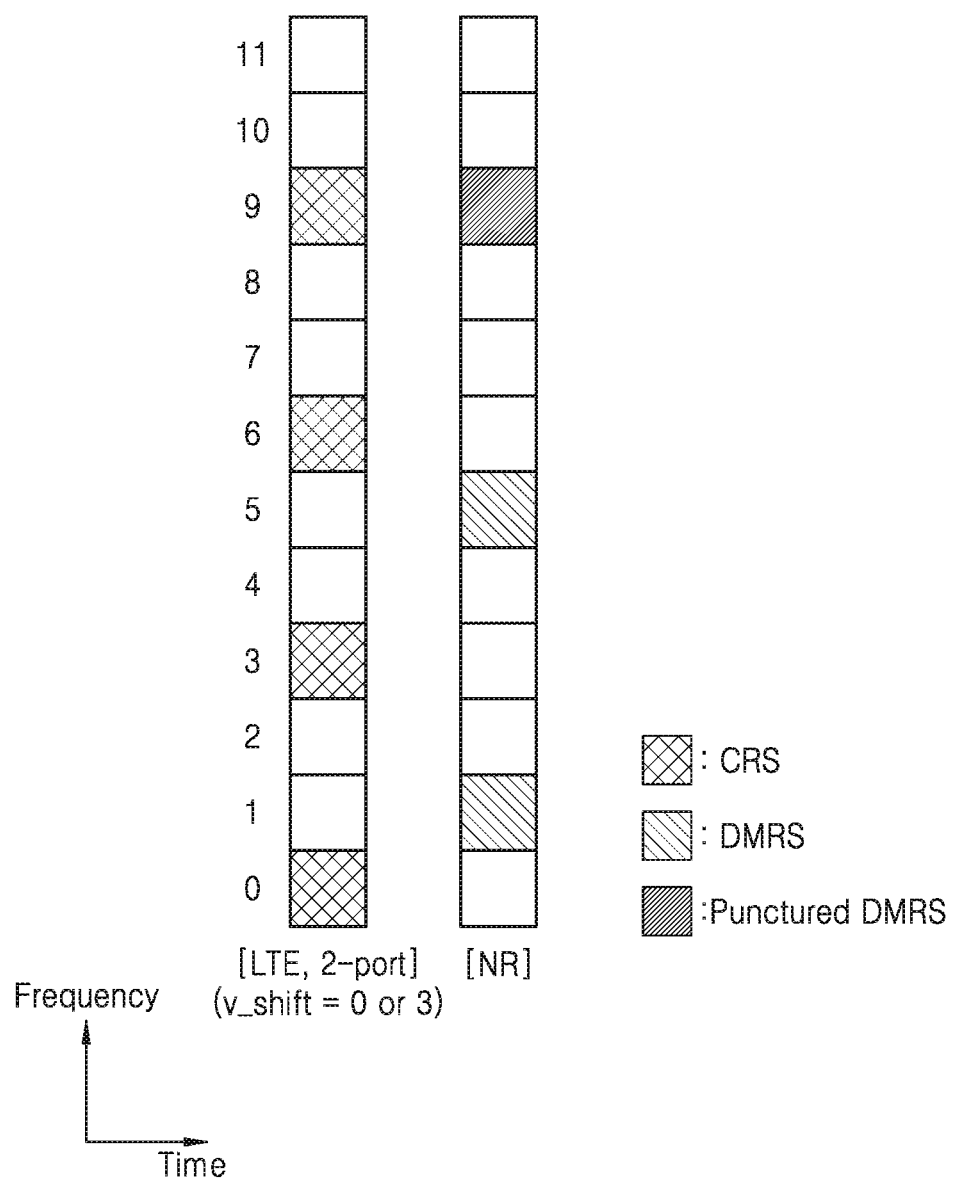
FIGS. 7A through 7C are diagrams illustrating an overlapping time-frequency domain in dynamic spectrum sharing (DSS) between an NR network and an LTE network.
Figure 7B:
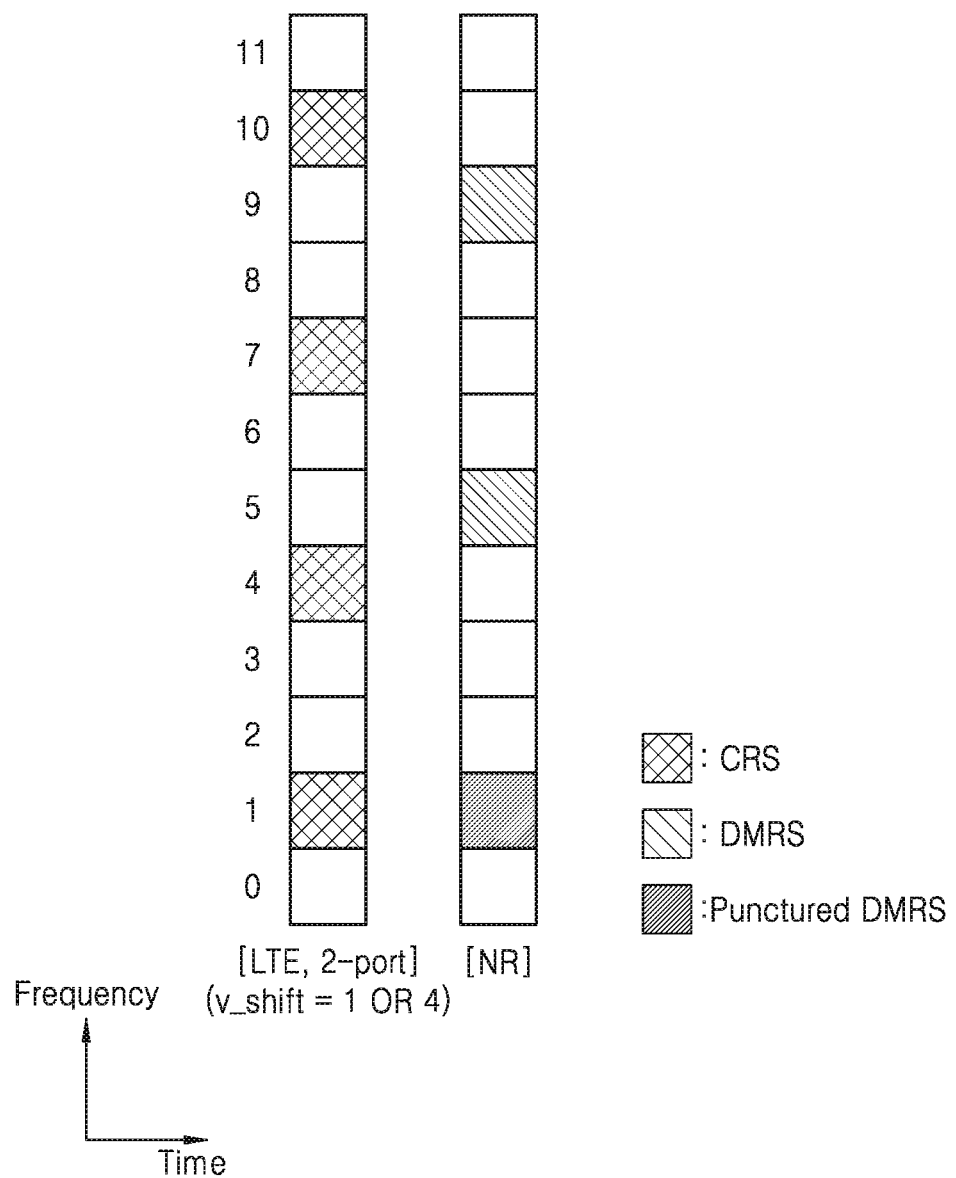
Figure 7C:
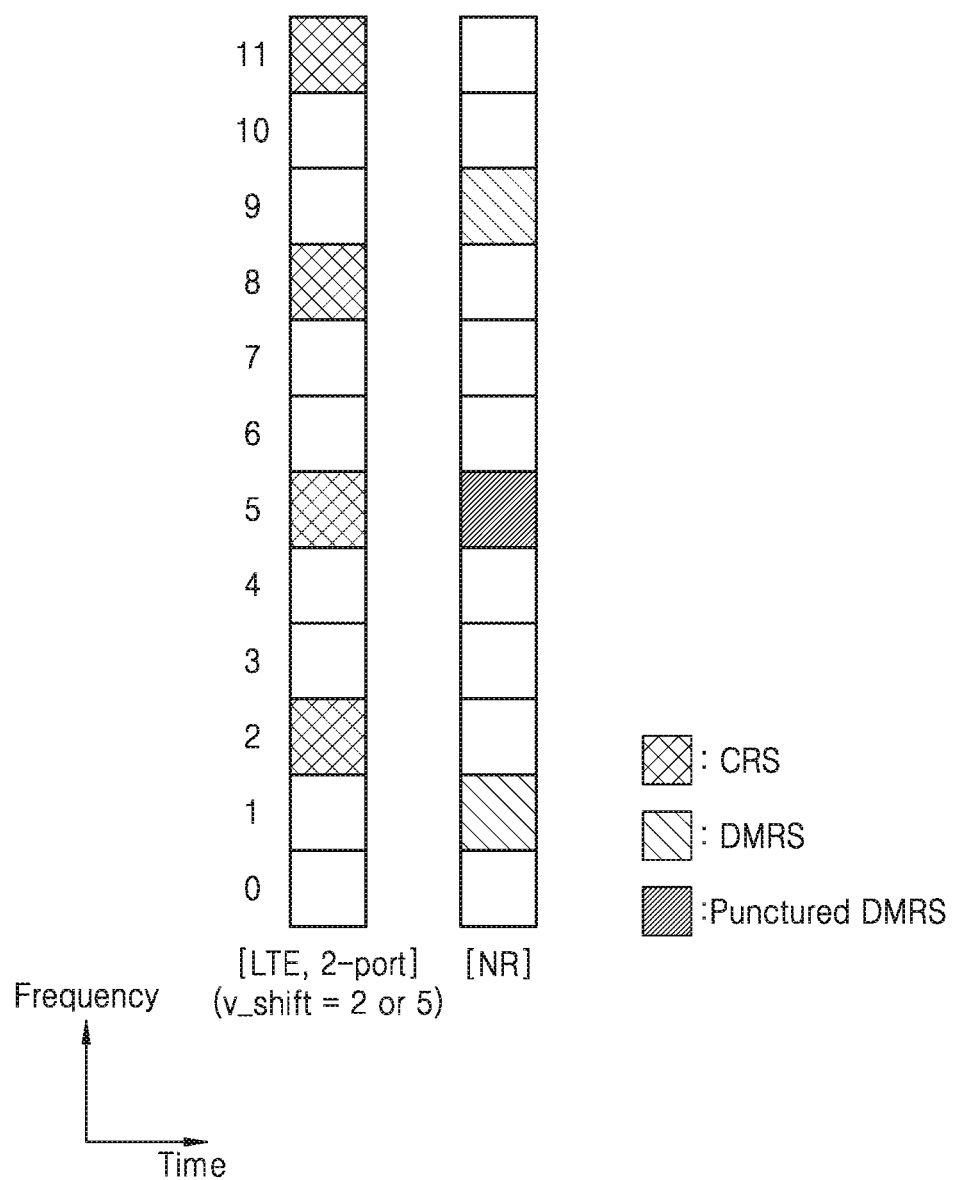

FIGS. 7A through 7C are diagrams illustrating an overlapping time-frequency domain in DSS between an NR network and an LTE network. In FIGS. 7A through 7C, twelve REs, i.e., first through twelfth REs 0 through 11, are arranged along the frequency axis and may be included in the overlapping time-frequency domain between the NR network and the LTE network.

FIGS. 7A through 7C respectively illustrate three LTE CRS rate matching patterns, which do not overlap with one another in two antenna ports, and examples of the overlap between a resource to be allocated to an NR DMRS and a resource allocated to an LTE CRS.

Referring to FIG. 7A, when a shift value v_shift, which is obtained by a modular operation of a cell identity (ID) in the LTE network, is 0 or 3, the first, fourth, seventh, and tenth REs 0, 3, 6, and 9 may be respectively allocated to CRSs according to a first-type frequency interval. The second, sixth, and tenth REs 1, 5, and 9 may be respectively allocated to DMRSs in the NR network. Therefore, a base station may puncture allocation of the tenth RE 9 to a DMRS, wherein the tenth RE 9 has been allocated to a CRS.

Referring to FIG. 7B, when the shift value v_shift is 1 or 4 in the LTE network, the second, fifth, eighth, and eleventh REs 1, 4, 7, and 10 may be respectively allocated to CRSs according to a second-type frequency interval. The second, sixth, and tenth REs 1, 5, and 9 may be respectively allocated to DMRSs in the NR network. Therefore, a base station may puncture allocation of the second RE 1 to a DMRS, wherein the second RE 1 has been allocated to a CRS.

Referring to FIG. 7C, when the shift value v_shift is 2 or 5 in the LTE network, the third, sixth, ninth, and twelfth REs 3, 6, 9, and 12 may be respectively allocated to CRSs according to a third-type frequency interval. The second, sixth, and tenth REs 1, 5, and 9 may be respectively allocated to DMRSs in the NR network. Therefore, a base station may puncture allocation of the sixth RE 5 to a DMRS, wherein the sixth RE 1 has been allocated to a CRS.

Figure 8:
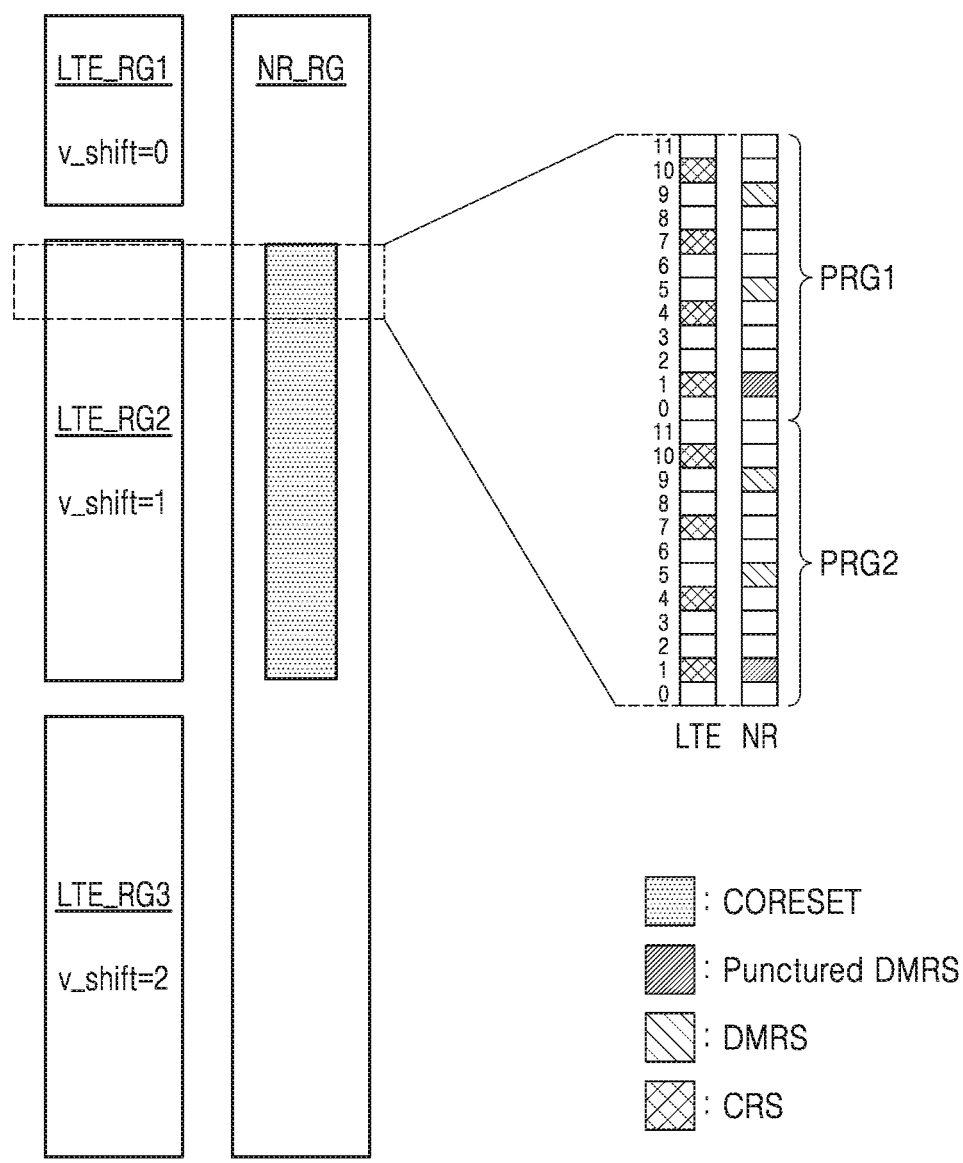
FIG. 8 is a diagram illustrating an example, in which a base station controls a control resource set (CORESET), according to an example embodiment.

FIG. 8 is a diagram illustrating an example, in which a base station controls a CORESET, according to an example embodiment. FIG. 8 suggests that a maximum frequency domain of LTE carriers is narrower than that of NR carriers and a time-frequency domain NR_RG of a carrier in the NR network may overlap with first through third time-frequency domains LTE_RG1 through LTE_RG3 of respective first through third carriers in the LTE network. Additionally, or alternatively, cell IDs respectively corresponding to the first time-frequency domains LTE_RG1 through third time-frequency domains LTE_RG3 may be different from one another. However, this is just an example, and embodiments are not limited thereto.

If the CORESET overlaps with the first through third time-frequency domains LTE_RG1 through LTE_RG3 respectively with different cell IDs, the number of punctured DMRS patterns, as shown in FIGS. 7A through 7C, may increase, and accordingly, the complexity of channel estimation of a UE may rapidly increase.

Referring to FIG. 8, the base station may control the CORESET allocated to an NR PDCCH to overlap with the second time-frequency domain LTE_RG2. In other words, the base station may limit a punctured DMRS pattern to a certain domain, thereby reducing the complexity of channel estimation of a UE. A portion of the CORESET may include a first precoding resource block group PRG1 and a second precoding resource block group PRG2. Each of the first and second precoding resource block groups PRG1 and PRG2 may be constituted of twelve REs 0 through 11.

In an example embodiment, the base station may puncture allocation of some DMRSs, taking into account resources allocated to CRSs in the second time-frequency domain LTE_RG2 corresponding to the first and second precoding resource block groups PRG1, PRG2. This has been described with reference to FIG. 7B, and thus, descriptions thereof are omitted.

Figure 9:
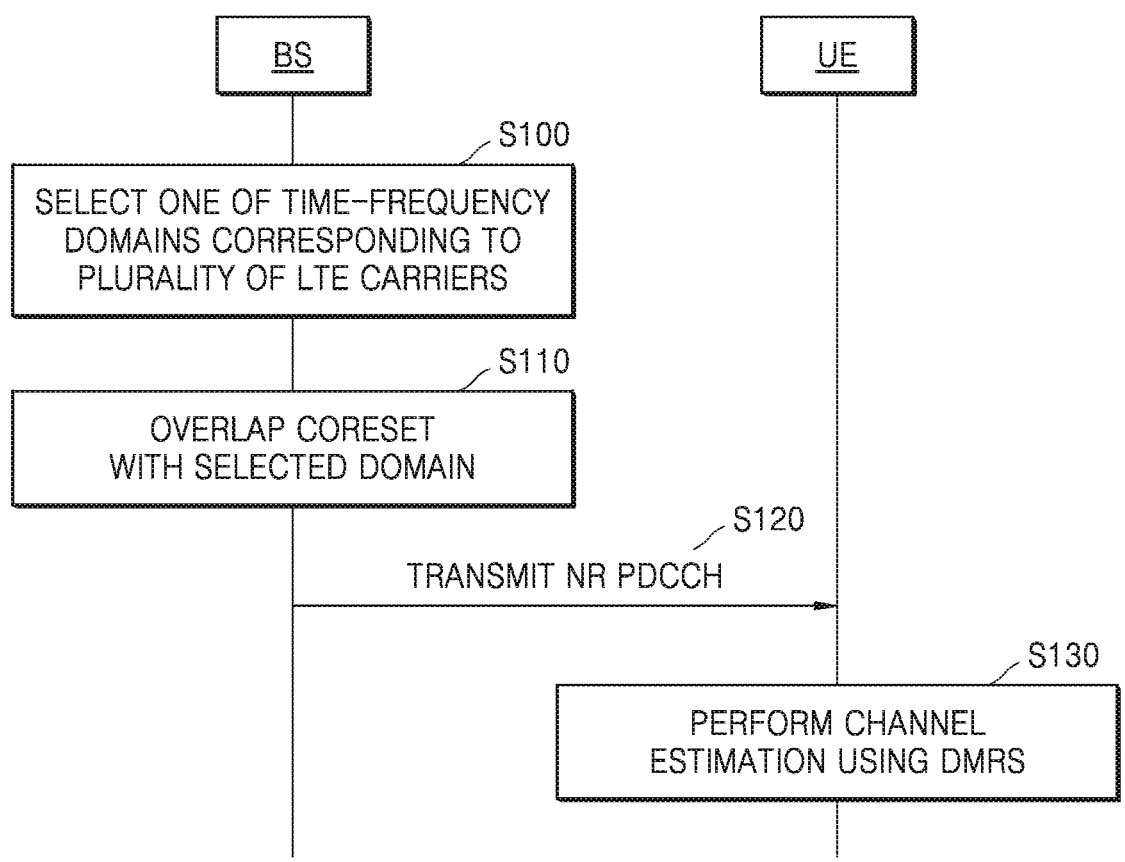
FIG. 9 is flowchart of an operating method of a wireless communication system, according to an example embodiment.

FIG. 9 is flowchart of an operating method of a wireless communication system, according to an example embodiment. A wireless communication system may support NR network-based communication and include a base station (BS) and a UE, which support DSS between an LTE network and an NR network. The configuration of the wireless communication system of FIG. 9 may be applied to FIGS. 13, 15A, 15B, and 16 described below.

Referring to FIG. 9, the BS may select one of time-frequency domains corresponding to a plurality of LTE carriers in operation S100. The BS may overlap a CORESET with the selected domain in operation S110. When the BS allocates the CORESET to an NR PDCCH, the BS may puncture allocation of a DMRS to a resource, which is allocated to a CRS of the selected domain, and accordingly, a punctured DMRS pattern may be in the selected domain. The BS may transmit the NR PDCCH, on which resource allocation is completed, to the UE in operation S120. The UE may estimate a downlink channel between the BS and the UE using a DMRS in the NR PDCCH and a punctured DMRS in operation S130.

Figure 10A:
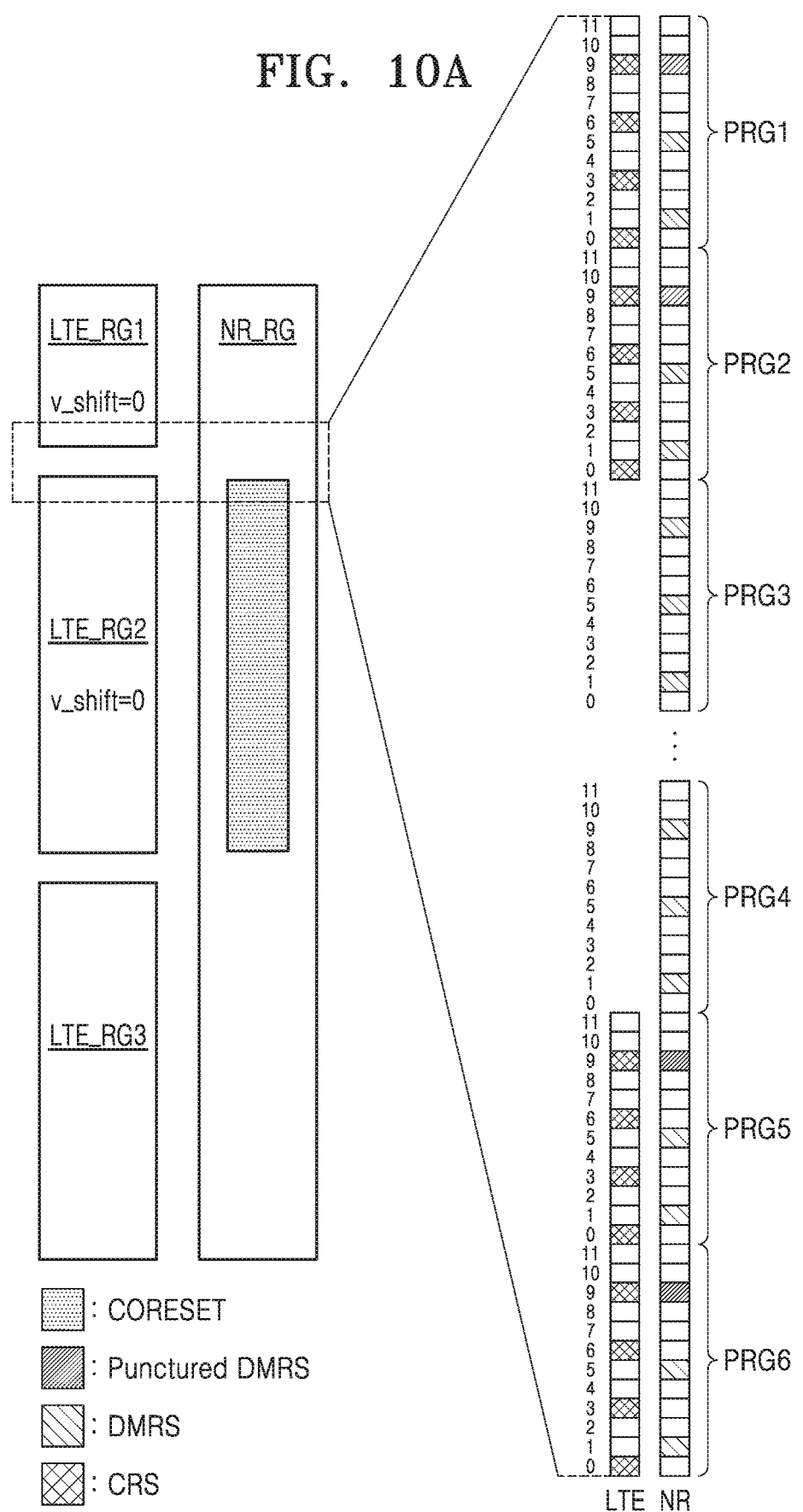
FIGS. 10A and 10B are diagrams illustrating an example, in which a base station controls a CORESET, according to an example embodiment.
Figure 10B:
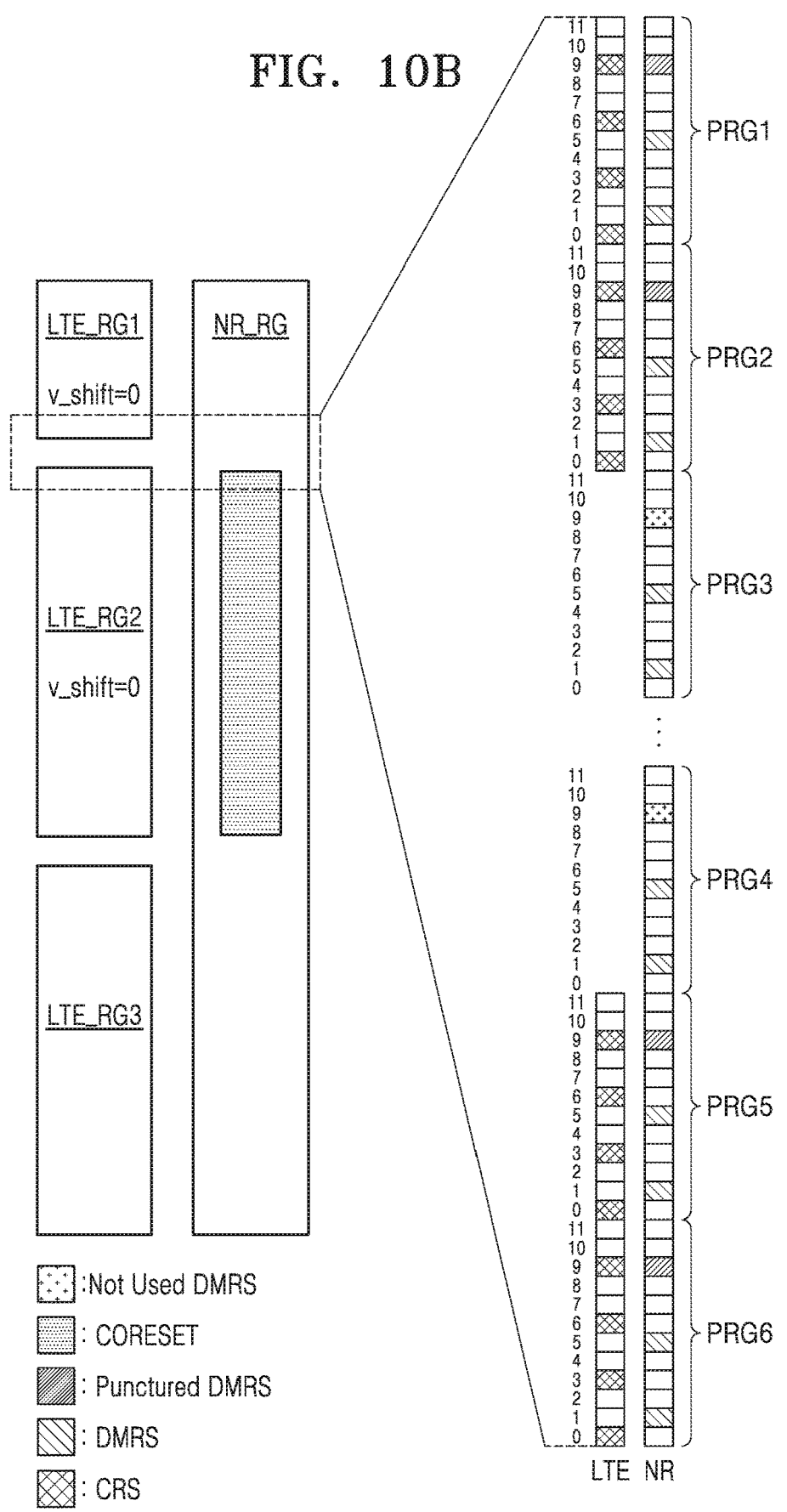

FIGS. 10A and 10B are diagrams illustrating an example, in which a BS controls a CORESET, according to an example embodiment. FIGS. 10A and 10B show that a maximum frequency domain of LTE carriers is narrower than that of NR carriers and the time-frequency domain NR_RG of a carrier in the NR network may overlap with the first through third time-frequency domains LTE_RG1 through LTE_RG3 of respective first through third carriers in the LTE network. Additionally, or alternatively, the punctured DMRS patterns in the time-frequency domain NR_RG of the NR network, which corresponds to the first and second time-frequency domains LTE_RG1 and LTE_RG2, may be the same as each other. However, this is just an example, and embodiments are not limited thereto.

Referring to FIG. 10A, when the punctured DMRS patterns of the CORESET allocated to an NR PDCCH are the same as each other in the first and second time-frequency domains LTE_RG1 and LTE_RG2, the BS may control the CORESET to overlap with the first and second time-frequency domains LTE_RG1 and LTE_RG2. A portion of the CORESET may include first through sixth precoding resource block groups PRG1 through PRG6. Each of the first through sixth precoding resource block groups PRG1 through PRG6 may be constituted of twelve REs 0 through 11.

In an example embodiment, the BS may puncture allocation of some DMRSs, taking into account resources allocated to CRSs in the first and second time-frequency domains LTE_RG1 and LTE_RG2. A BS may control a region allocated to an NR PDCCH to overlap with frequency domains respectively corresponding to at least two carriers that have the same LTE cell identity (ID) (e.g., and thus have the same CRS rate matching pattern). For example, because a CRS rate matching pattern is the same between the first and second time-frequency domains LTE_RG1 and LTE_RG2, a punctured DMRS pattern of the first and second precoding resource block groups PRG1 and PRG2 overlapping with the first time-frequency domain LTE_RG1 may be the same as a punctured DMRS pattern of the fifth and sixth precoding resource block groups PRG5 and PRG6 overlapping with the second time-frequency domain LTE_RG2. As a result, a punctured DMRS pattern may be regularly controlled, and accordingly, the complexity of channel estimation of a UE may be reduced.

In an example embodiment, when a UE estimates a channel corresponding to the first and second precoding resource block groups PRG1 and PRG2, the UE may use a pattern resulting from subtraction of a punctured DMRS pattern from a DMRS pattern. In detail, the UE may estimate the channel corresponding to the first and second precoding resource block groups PRG1 and PRG2 by using DMRS allocated to the second and sixth REs 1 and 5.

A signal of the LTE network is not allocated to a guard band between the first and second time-frequency domains LTE_RG1 and LTE_RG2, and accordingly, DMRS allocation may not be punctured in the third and fourth precoding resource block groups PRG3 and PRG4. In an example embodiment, a UE may use some or all DMRS patterns when estimating a channel corresponding to the third and fourth precoding resource block groups PRG3 and PRG4. In detail, the UE may estimate the channel corresponding to the third and fourth precoding resource block groups PRG3 and PRG4 using DMRSs allocated to the second, sixth, and tenth REs 1, 5, and 9.

Referring to FIG. 10B, to secure consistency with a channel estimation method corresponding to the first, second, fifth, and sixth precoding resource block groups PRG1, PRG2, PRG5, and PRG6, a UE may not use a DMRS allocated to the tenth RE 9, if the DMRS is punctured, when estimating the channel corresponding to the third and fourth precoding resource block groups PRG3 and PRG4. Accordingly, DMRS patterns used for channel estimation corresponding to the first through sixth precoding resource block groups PRG1 through PRG6 may be the same as one another, and the complexity of channel estimation of a UE may be reduced.

Figure 11:
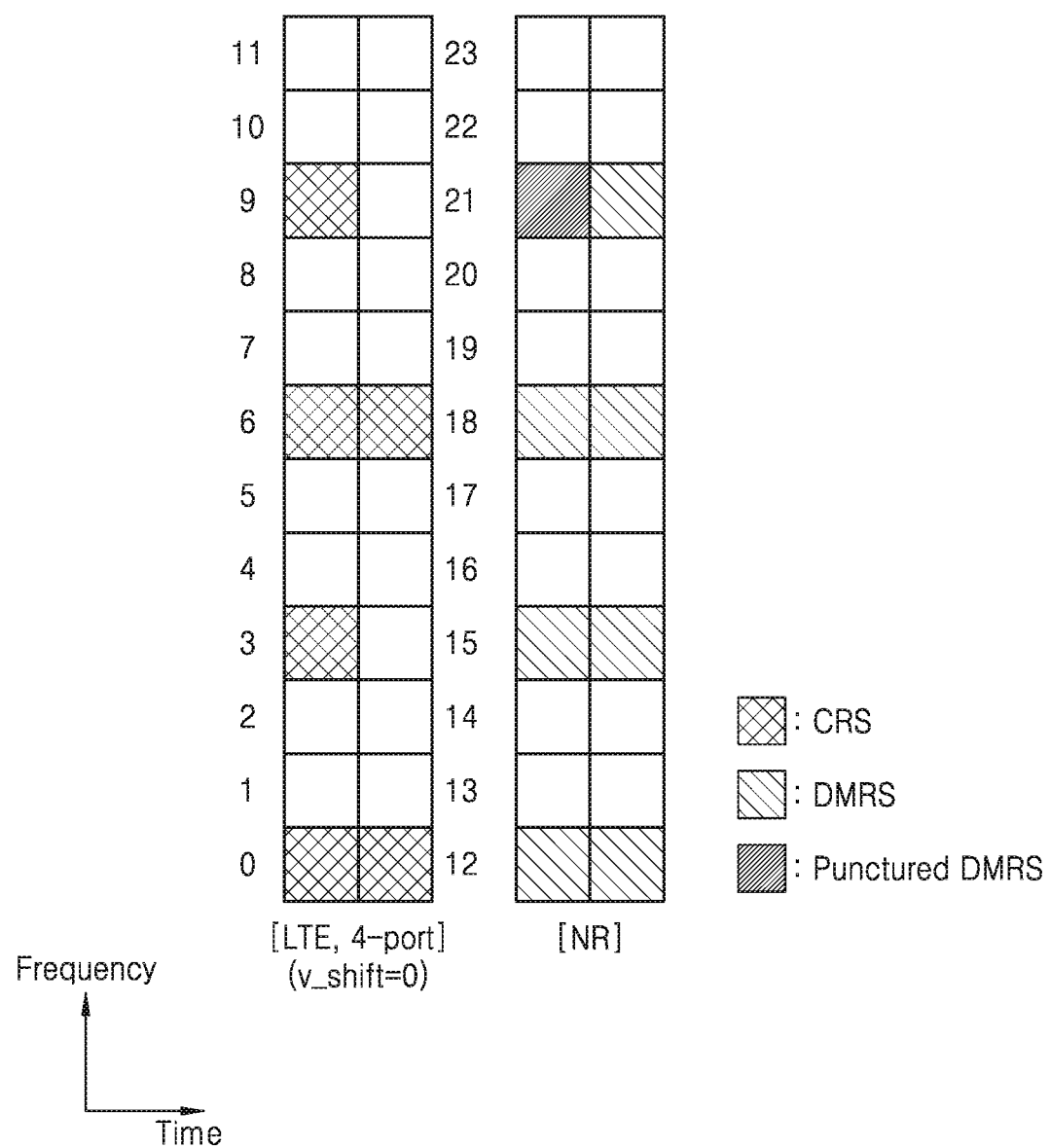
FIG. 11 is a diagram illustrating an overlapping time-frequency domain in DSS between an NR network and an LTE network, according to an example embodiment.

FIG. 11 is a diagram illustrating an overlapping time-frequency domain in DSS between an NR network and an LTE network, according to an example embodiment. FIG. 11 shows 24 REs 0 through 23 arranged in two columns each being along the frequency axis. The 24 REs 0 through 23 may be included in an overlapping time-frequency domain between the NR network and the LTE network.

FIG. 11 illustrates a single CRS rate matching pattern of LTE in four antenna ports and illustrates an example of the overlap between resources to be allocated to DMRSs of NR and resources allocated to CRSs of LTE.

Referring to FIG. 11, when the shift value v_shift of the LTE network is 0, the first, fourth, seventh, tenth, thirteenth, and nineteenth REs 0, 3, 6, 9, 12, and 18 may be respectively allocated to CRSs according to a certain frequency interval. The second, sixth, tenth, fourteenth, and eighteenth REs 1, 5, 9, 13, 17, and 21 may be respectively allocated to DMRSs in the NR network. As a result, a BS may puncture allocation of the tenth RE 9 to a DMRS, wherein the tenth RE 9 has been allocated to a CRS.

When a DMRS is allocated to one of the tenth and 22nd REs 9 and 21, which are adjacent to each other on the time axis, and punctured in the other of the tenth and 22nd REs 9 and 21, the complexity of channel estimation of a UE may increase. Hereinafter, embodiments of a UE for reducing the complexity of channel estimation are described.

In an example embodiment, a UE may not use the DMRS allocated to the 22nd RE 21, if that DMRS allocation is punctured in the 22nd RE 21. The UE may perform channel estimation using the DMRSs allocated to the second, sixth, fourteenth, and eighteenth REs 1, 5, 13, and 17.

In an example embodiment, a UE may reuse the DMRS allocated to the 22nd RE 21, if the DMRS allocated to 22nd RE 21 is allocated to the tenth RE 9. In other words, the respective states of channels respectively corresponding to the tenth and 22nd REs 9 and 21, which are adjacent to each other on the time axis, may be similar to each other, and accordingly, the UE may increase the accuracy of channel estimation by reusing the DMRS allocated to the 22nd RE 21.

Figure 12A:
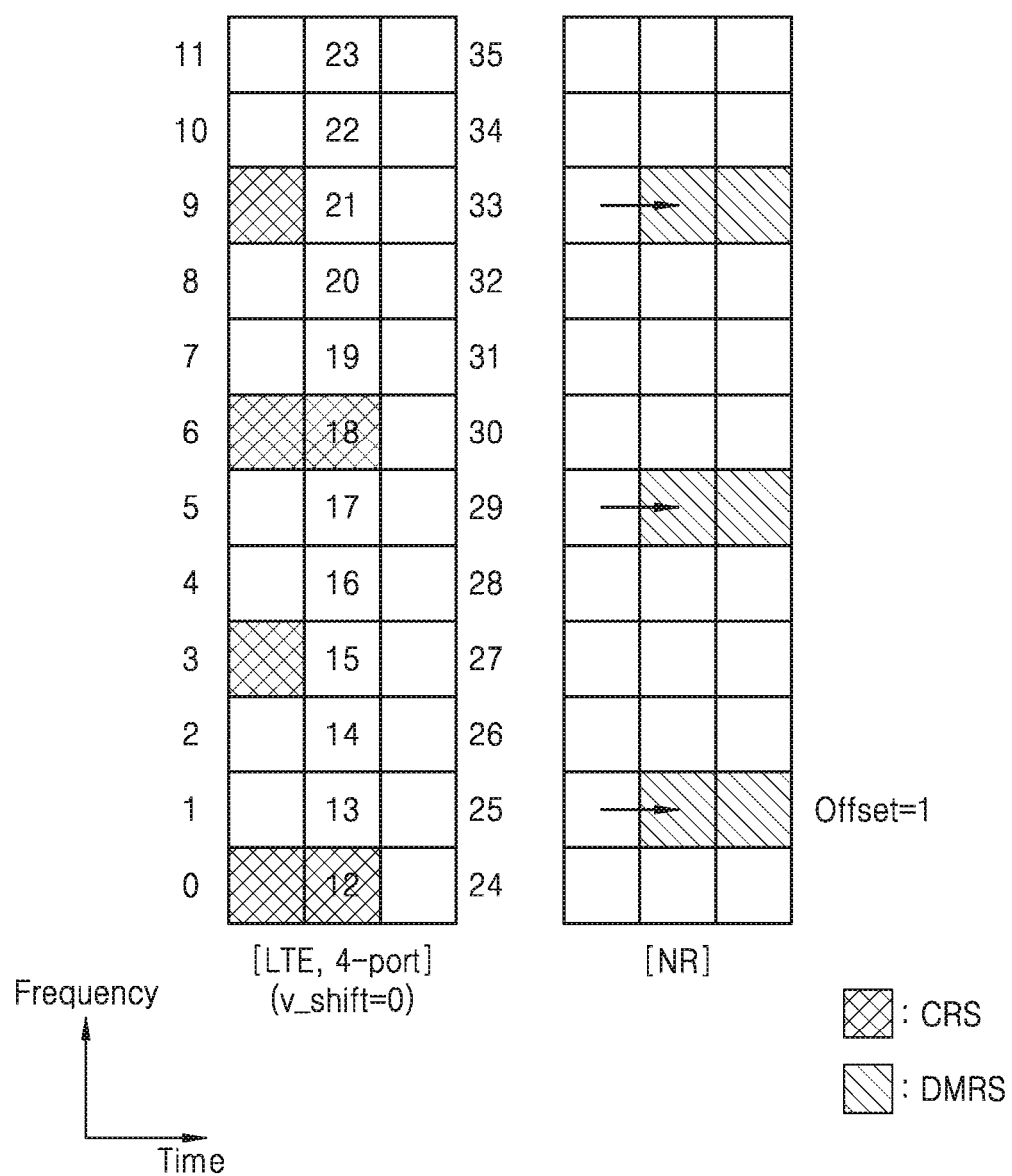
FIGS. 12A and 12B are diagrams illustrating an overlapping time-frequency domain in DSS between an NR network and an LTE network.
Figure 12B:
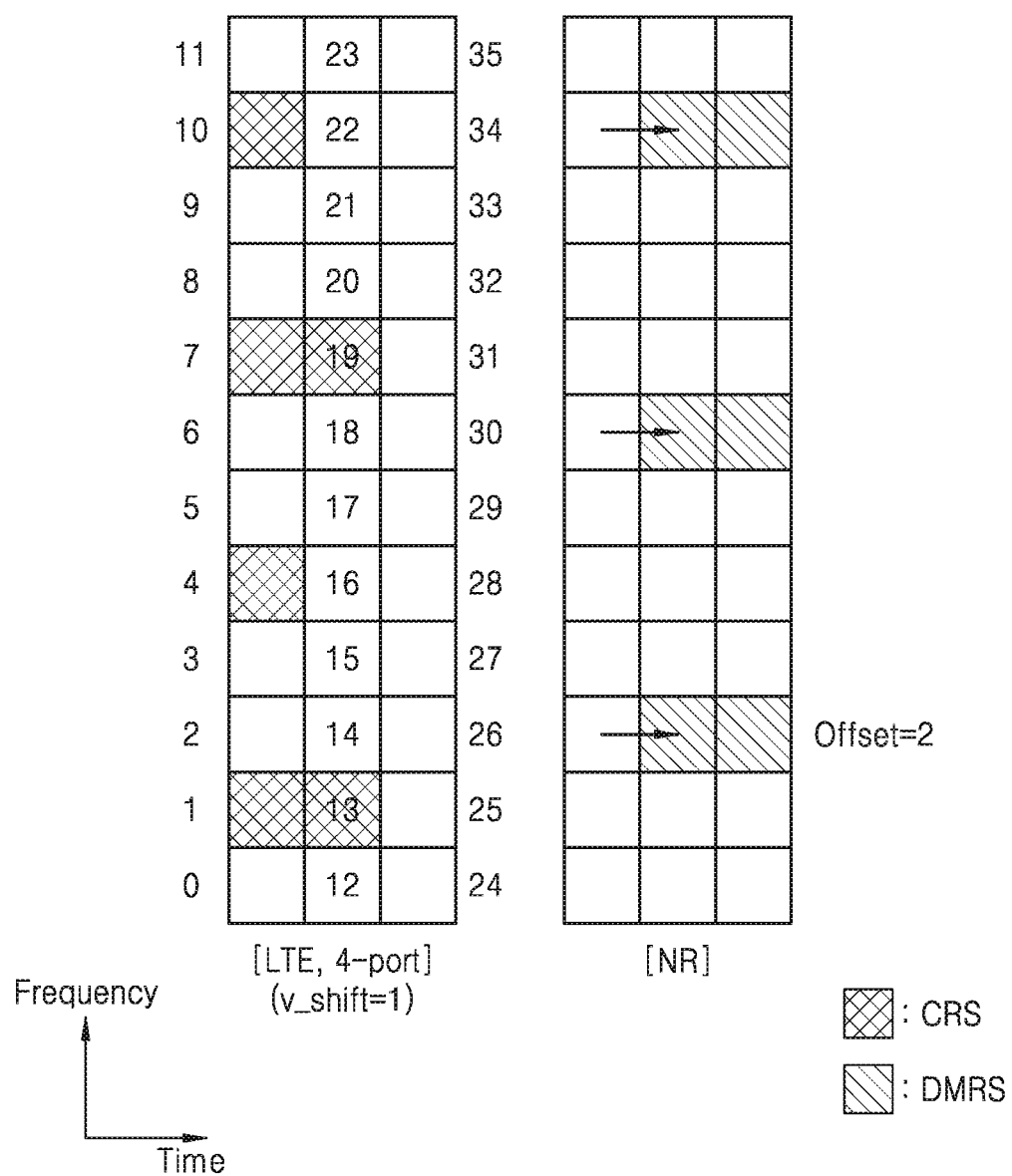

FIGS. 12A and 12B are diagrams illustrating an overlapping time-frequency domain in DSS between an NR network and an LTE network. FIGS. 12A and 12B show 36 REs 0 through 35 arranged in three columns each being along the frequency axis. The 36 REs 0 through 35 may be included in an overlapping time-frequency domain between the NR network and the LTE network.

FIGS. 12A and 12B illustrate two CRS rate matching patterns of LTE in four antenna ports.

Referring to FIG. 12A, when the shift value v_shift of the LTE network is 0, the first, fourth, seventh, tenth, thirteenth, and nineteenth REs 0, 3, 6, 9, 12, and 18 may be respectively allocated to CRSs according to a certain frequency interval.

In an example embodiment, a BS may adjust a resource allocation offset for a DMRS to 1 such that REs to be allocated to DMRSs do not overlap with the first, fourth, seventh, tenth, thirteenth, and nineteenth REs 0, 3, 6, 9, 12, and 18 allocated to CRSs. The resource allocation offset may indicate a start RE of a frequency-axis DMRS pattern. In FIG. 12A, the start RE of a frequency-axis DMRS pattern may be the second RE 1.

In an example embodiment, a BS may shift the REs to be allocated to DMRSs on the time axis such that the REs to be allocated to DMRSs do not overlap with the first, fourth, seventh, tenth, thirteenth, and nineteenth REs 0, 3, 6, 9, 12, and 18 allocated to CRSs. As a result, the BS may respectively allocate the fourteenth, eighteenth, 22nd, 26th, 30th, and 34th REs 13, 17, 21, 25, 29, and 33 to DMRSs.

In an example embodiment, a BS may perform at least one selected from the resource allocation offset adjustment and the shift operation on a portion of a time-frequency domain, in which the overlap between REs allocated to CRSs and REs to be allocated to DMRSs is expected.

Referring to FIG. 12B, when the shift value v_shift of the LTE network is 1, the second, fifth, eighth, eleventh, fourteenth, and twentieth REs 1, 4, 7, 10, 13, and 19 may be respectively allocated to CRSs according to a certain frequency interval.

In an example embodiment, a BS may adjust a resource allocation offset for a DMRS to 2 such that REs to be allocated to DMRSs do not overlap with the second, fifth, eighth, eleventh, fourteenth, and twentieth REs 1, 4, 7, 10, 13, and 19 allocated to CRSs. In FIG. 12B, the start RE of a frequency-axis DMRS pattern may be the third RE 2.

In an example embodiment, a BS may shift the REs to be allocated to DMRSs on the time axis such that the REs to be allocated to DMRSs do not overlap with the second, fifth, eighth, eleventh, fourteenth, and twentieth REs 1, 4, 7, 10, 13, and 19 allocated to CRSs. As a result, the BS may respectively allocate the fifteenth, nineteenth, 23rd, 27th, 31st, and 35th REs 14, 18, 22, 26, 30, and 33 to DMRSs.

Figure 13:
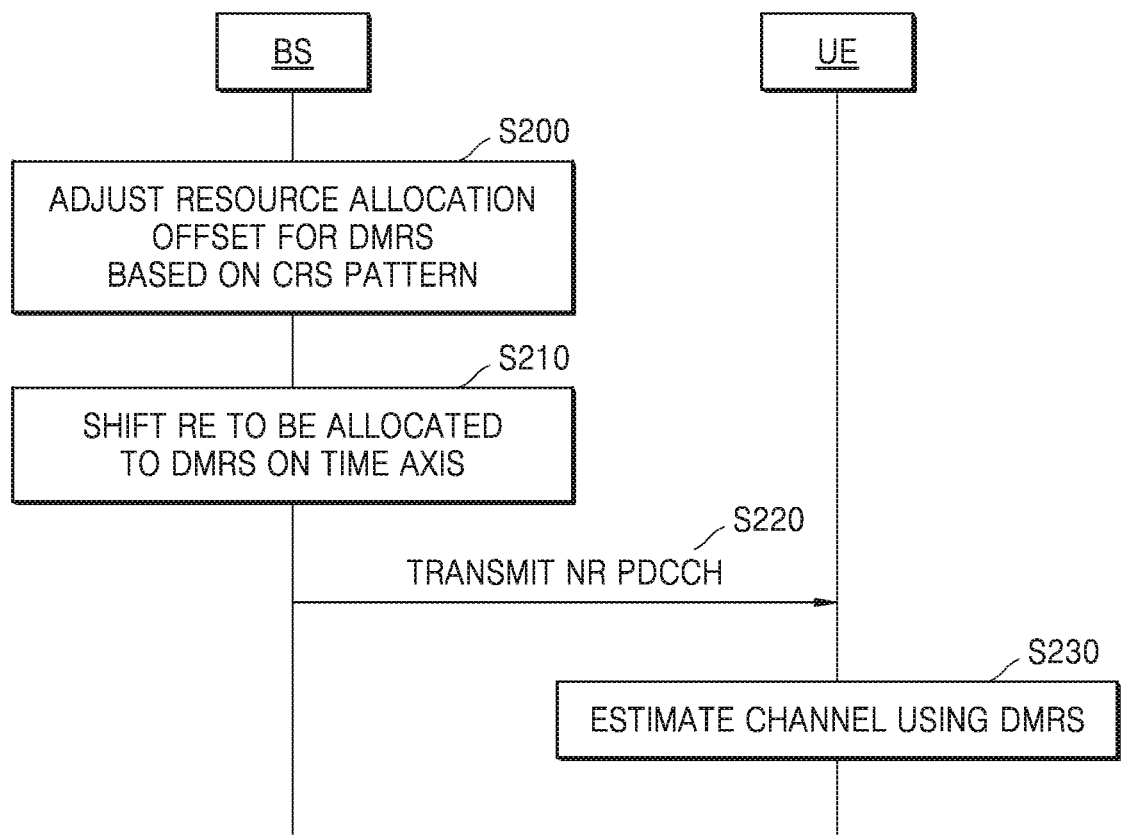
FIG. 13 is flowchart of an operating method of a wireless communication system, according to an example embodiment.

FIG. 13 is flowchart of an operating method of a wireless communication system, according to an example embodiment.

Referring to FIG. 13, a BS may adjust a resource allocation offset for DMRSs based on a CRS pattern of an LTE network in operation S200. The BS may identify whether resources allocated to CRSs overlap with resources to be allocated to DMRSs. When the overlap is identified, the BS may adjust a resource allocation offset for the DMRSs in an overlapping domain. The BS may shift REs to be allocated to the DMRSs on the time axis in the overlapping domain, for which the resource allocation offset has been adjusted, in operation S210. Through operations S200 and S210, the resources allocated to the CRSs of the LTE network do not overlap with the resources allocated to the DMRSs of an NR network. The BS may transmit an NR PDCCH, on which resource allocation is completed, to a UE in operation S220. The UE may estimate a downlink channel between the BS and the UE using DMRSs of the NR PDCCH in operation S230. Because the UE does not consider a punctured DMRS pattern for channel estimation, the complexity of the channel estimation may be reduced, and channel estimation performance may be increased.

Figure 14:
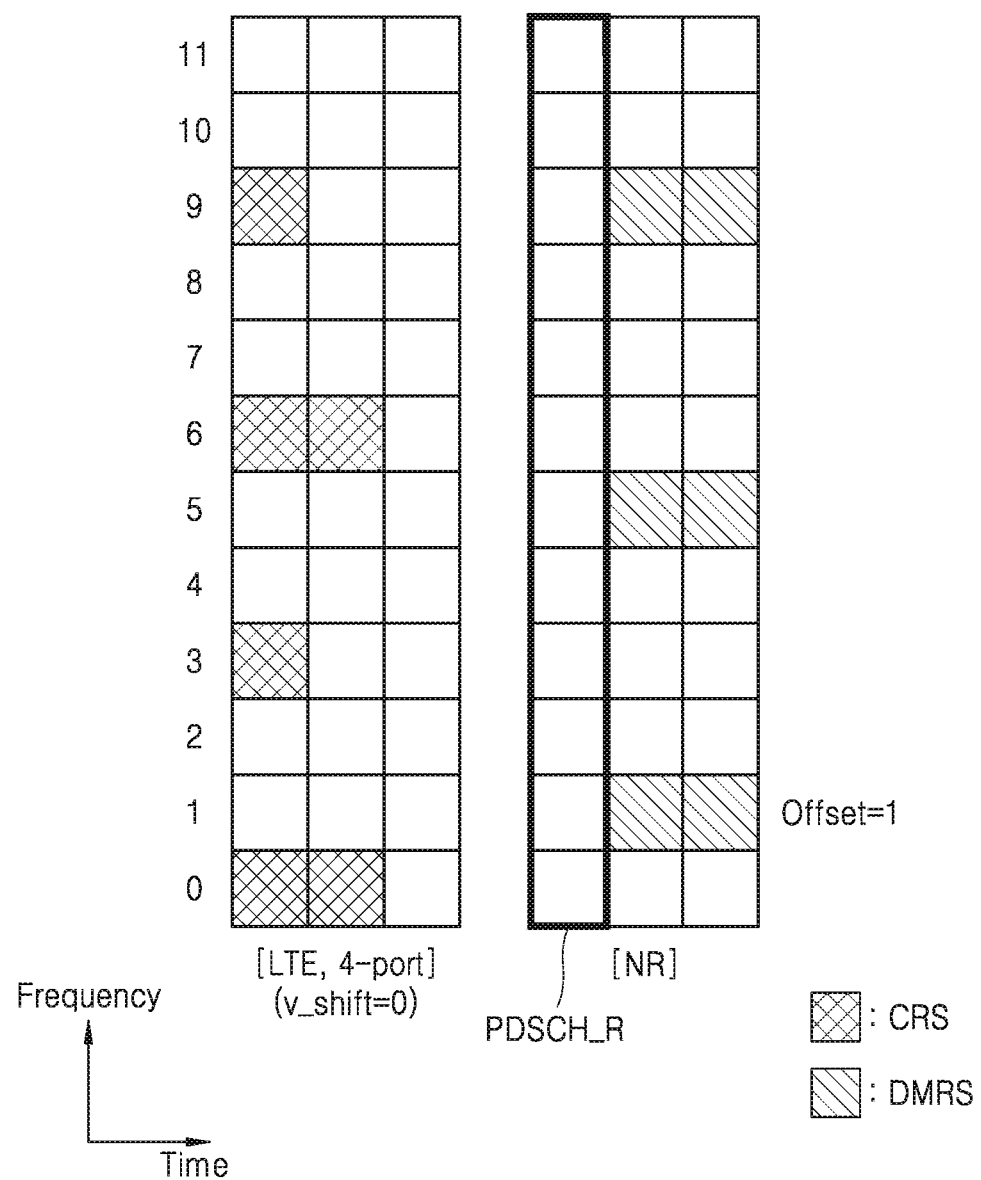
FIG. 14 is a diagram for describing a method of allocating an NR physical downlink shared channel (PDSCH) of a base station, according to an example embodiment.

FIG. 14 is a diagram for describing a method of allocating an NR PDSCH of a BS, according to an example embodiment. The operation of the BS described with reference to FIG. 12A is assumed.

Referring to FIG. 14, because of the shift of REs to be allocated to DMRSs, there may be the first through twelfth REs 0 through 11 that may not be allocated to a signal or a shared channel of an NR network. In an example embodiment, a BS may allocate a region including the first through twelfth REs 0 through 11 to a signal or shared channel of the NR network. For example, the BS may allocate the first through twelfth REs 0 through 11 to an NR PDSCH, and a region including the first through twelfth REs 0 through 11 may be referred to as a PDSCH allocation region PDSCH_R.

The embodiment of FIG. 14 may be applied to NR PDSCH mapping type B between NR PDSCH mapping type A and NR PDSCH mapping type B. In NR PDSCH mapping type B according to the related art, resources before an NR PDSCH on the time axis may not be allocated to the NR PDSCH. However, according to an example embodiment, a BS may allocate resources, which are before an NR PDSCH on the time axis, to the NR PDSCH in NR PDSCH mapping type B.

Figure 15A:
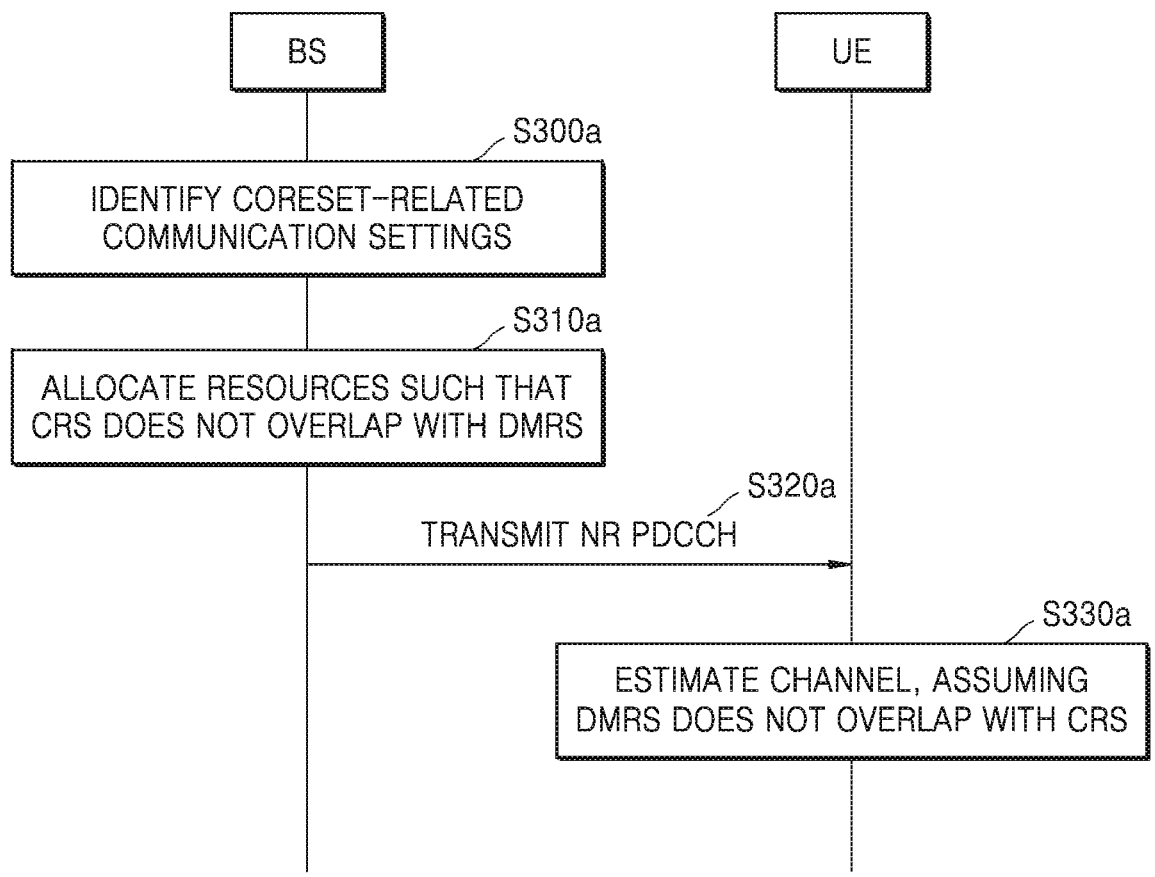
FIGS. 15A and 15B are flowcharts of operating methods of a wireless communication system, according to example embodiments.
Figure 15B:
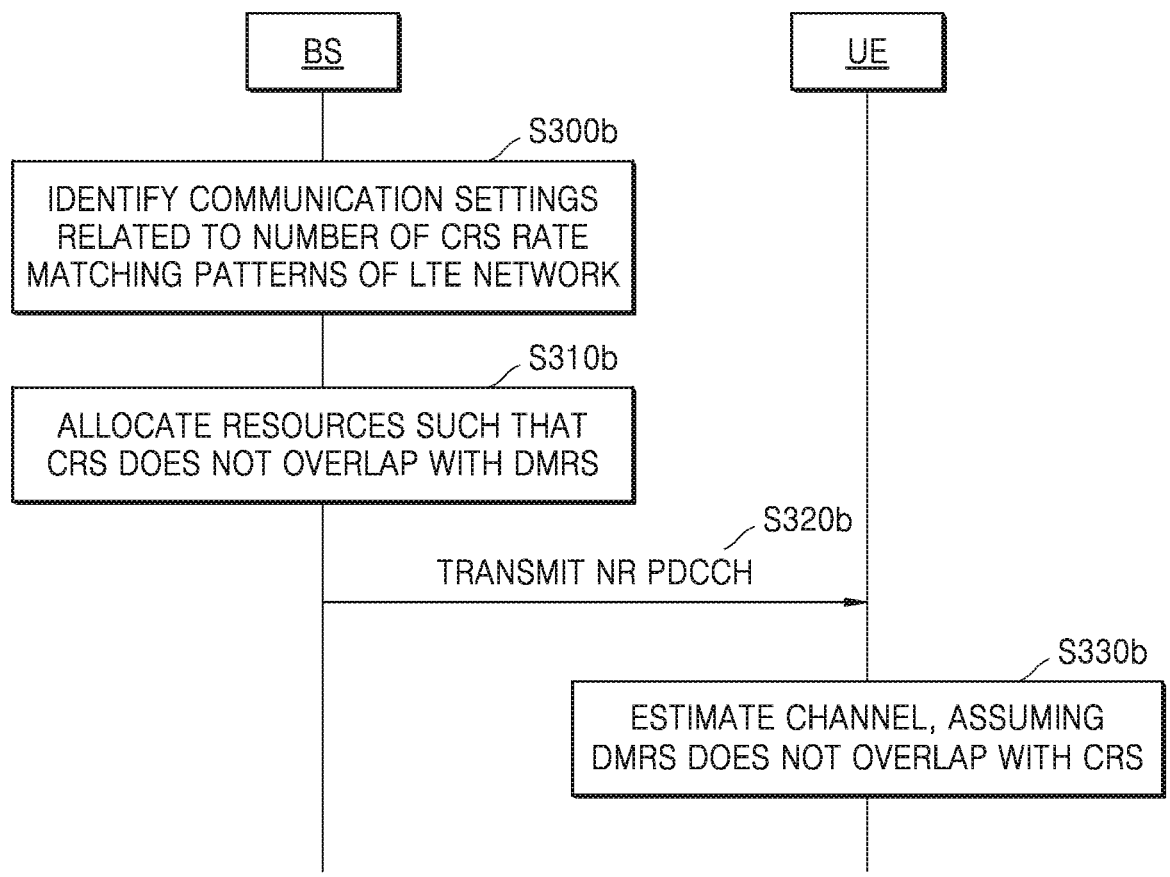

FIGS. 15A and 15B are flowcharts of operating methods of a wireless communication system, according to example embodiments.

In an example embodiment, a BS may not allow the overlap between resources allocated to CRSs of an LTE network and resources to be allocated to DMRSs of an NR network in communication settings, in which the irregularity of a punctured DMRS pattern is expected to be high.

Referring to FIG. 15A, the BS may identify CORESET-related communication settings in operation S300*a*. When a CORESET (or an NR PDCCH allocation region) is set to an entire frequency domain or a frequency domain that may be higher or equal to a threshold value, a punctured DMRS pattern may be throughout the entire frequency domain or the frequency domain that may be higher or equal to the threshold value, and accordingly, the complexity of channel estimation of a UE may be rapidly increased. Therefore, in the above case, the BS may not allow the overlap between resources allocated to CRSs and resources to be allocated to DMRSs of the NR network. In response to a determination not to allow the overlap, the BS may allocate resources to an NR PDCCH such that a CRS does not overlap with a DMRS in operation S310*a*. The BS may transmit the NR PDCCH, on which resource allocation is completed, to a UE in operation S320*a*. If a CRS does not overlap with a DMRS, the UE may estimate a downlink channel between the BS and the UE using DMRSs of the NR PDCCH in operation S330*a*.

Referring to FIG. 15B, the BS may identify communication settings related to the number of CRS rate matching patterns of the LTE network in operation S300*b*. As described above with reference to FIG. 8, communication may be performed using a plurality of carriers in the LTE network. When the number of CRS rate matching patterns applicable to a time-frequency domain corresponding to a single carrier is set to be plural or higher than or equal to a threshold value, the number of punctured DMRS patterns may increase, and accordingly, the complexity of channel estimation of a UE may rapidly increase. Therefore, in the above case, the BS may not allow the overlap between resources allocated to CRSs and resources to be allocated to DMRSs of the NR network. In response to a determination not to allow the overlap, the BS may allocate resources to an NR PDCCH such that a CRS does not overlap with a DMRS in operation S310*b*. The BS may transmit the NR PDCCH, on which resource allocation is completed, to a UE in operation S320*b*. If a CRS does not overlap with a DMRS, the UE may estimate a downlink channel between the BS and the UE using DMRSs of the NR PDCCH in operation S330*b*.

In an example embodiment, the UE may be provided with information about the communication settings from the BS and may identify whether a DMRS overlaps with a CRS in advance.

Figure 16:
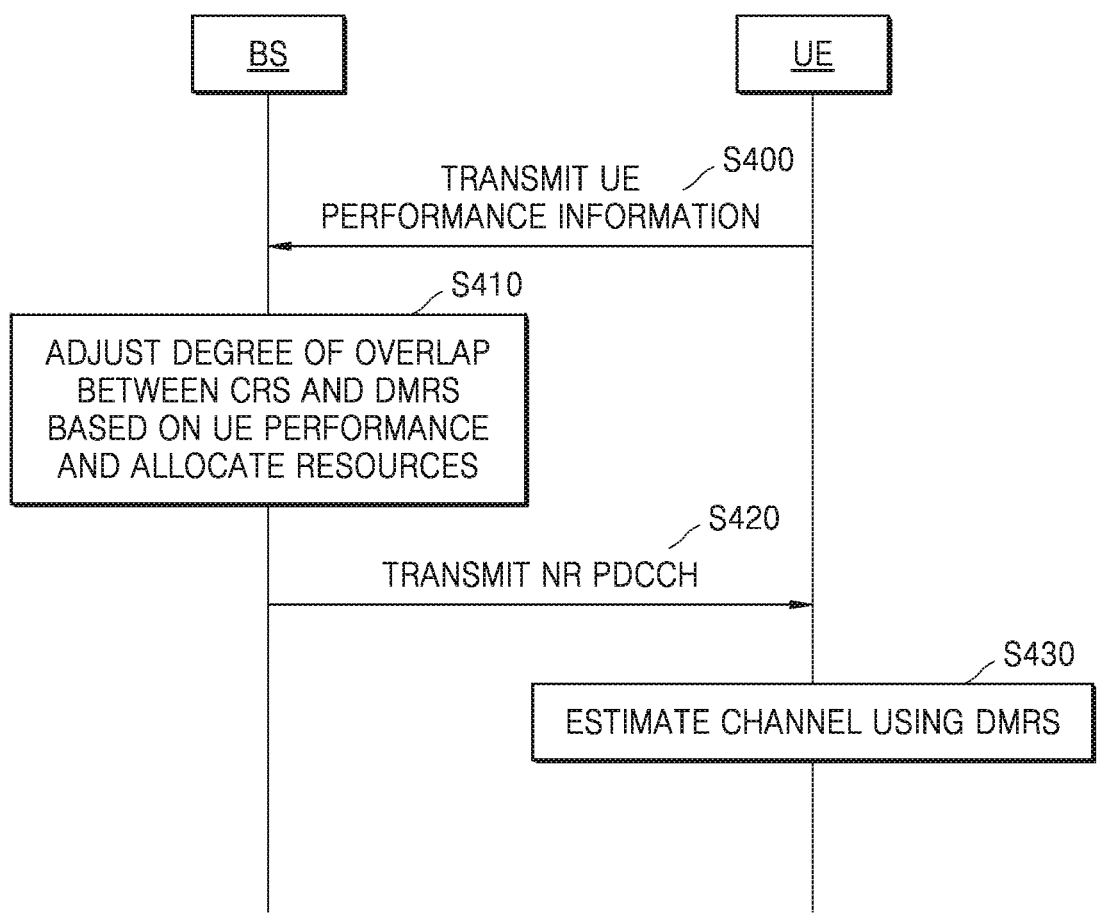
FIG. 16 is flowchart of an operating method of a wireless communication system, according to an example embodiment.

FIG. 16 is flowchart of an operating method of a wireless communication system, according to an example embodiment.

Referring to FIG. 16, a UE may transmit UE performance information to a BS in operation S400. The UE performance information may indicate a supportable count of punctured DMRS patterns that may be managed by the UE. The BS may adaptively perform resource allocation, which is consistent with the performance of the UE, based on the UE performance information. In some examples, the BS may perform resource allocation, taking into account the performance of the UE, such that a PDCCH includes as many DMRS patterns as manageable by the user equipment. The BS may adjust the degree of the overlap between CRSs and DMRSs based on the performance of the UE and allocate resources to an NR PDCCH in operation S410. For example, the BS may set the supportable count of punctured DMRS patterns to be a maximum value and allocate resources to the NR PDCCH such that the number of punctured DMRS patterns is less than the maximum value. The BS may transmit the NR PDCCH, on which resource allocation is completed, to the UE in operation S420. The UE may estimate a downlink channel between the BS and the UE using DMRSs of the NR PDCCH and punctured DMRSs.

Figure 17A:
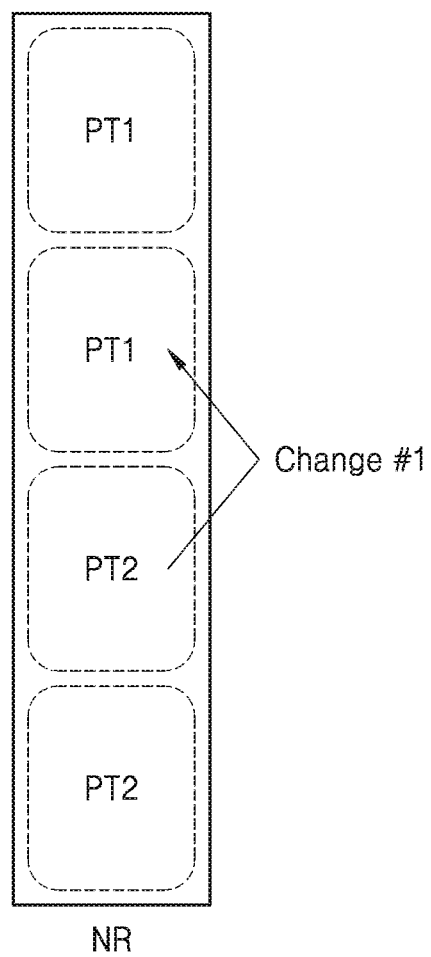
FIGS. 17A and 17B are diagrams for describing the performance of a UE in FIG. 16, according to an example embodiment.
Figure 17B:
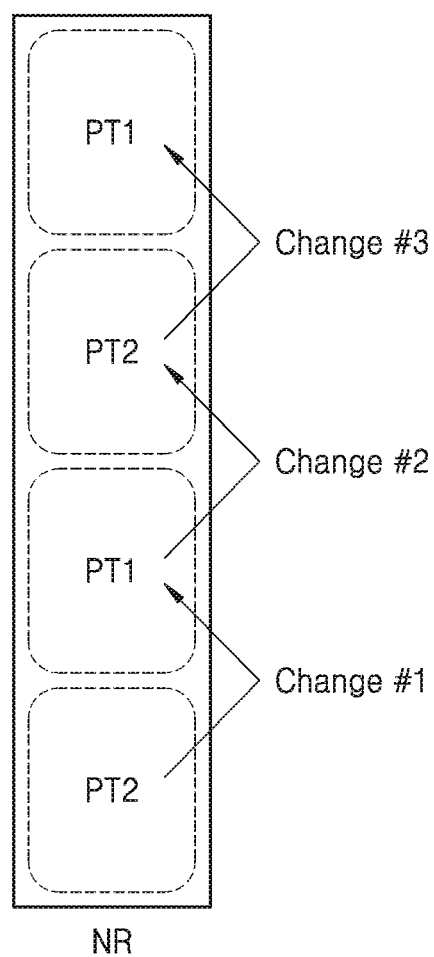

FIGS. 17A and 17B are diagrams for describing the performance of a UE in FIG. 16, according to an example embodiment.

In an example embodiment, a UE's supportable count of punctured DMRS patterns may indicate the number of available changes in punctured DMRS patterns in a CORESET.

Referring to FIG. 17A, a CORESET may include a first punctured DMRS pattern PT1 and a second punctured DMRS pattern PT2, and the number of changes in punctured DMRS patterns in the CORESET may be 1.

Referring to FIG. 17B, although a CORESET may include the first and second punctured DMRS patterns PT1 and PT2 like FIG. 17A, the number of changes in punctured DMRS patterns in the CORESET may be 3.

In an example embodiment, a BS may perform resource allocation on an NR PDCCH based on the number of available changes in punctured DMRS patterns of a UE. The BS may perform resource allocation adaptive to the performance of the UE.

Figure 18:
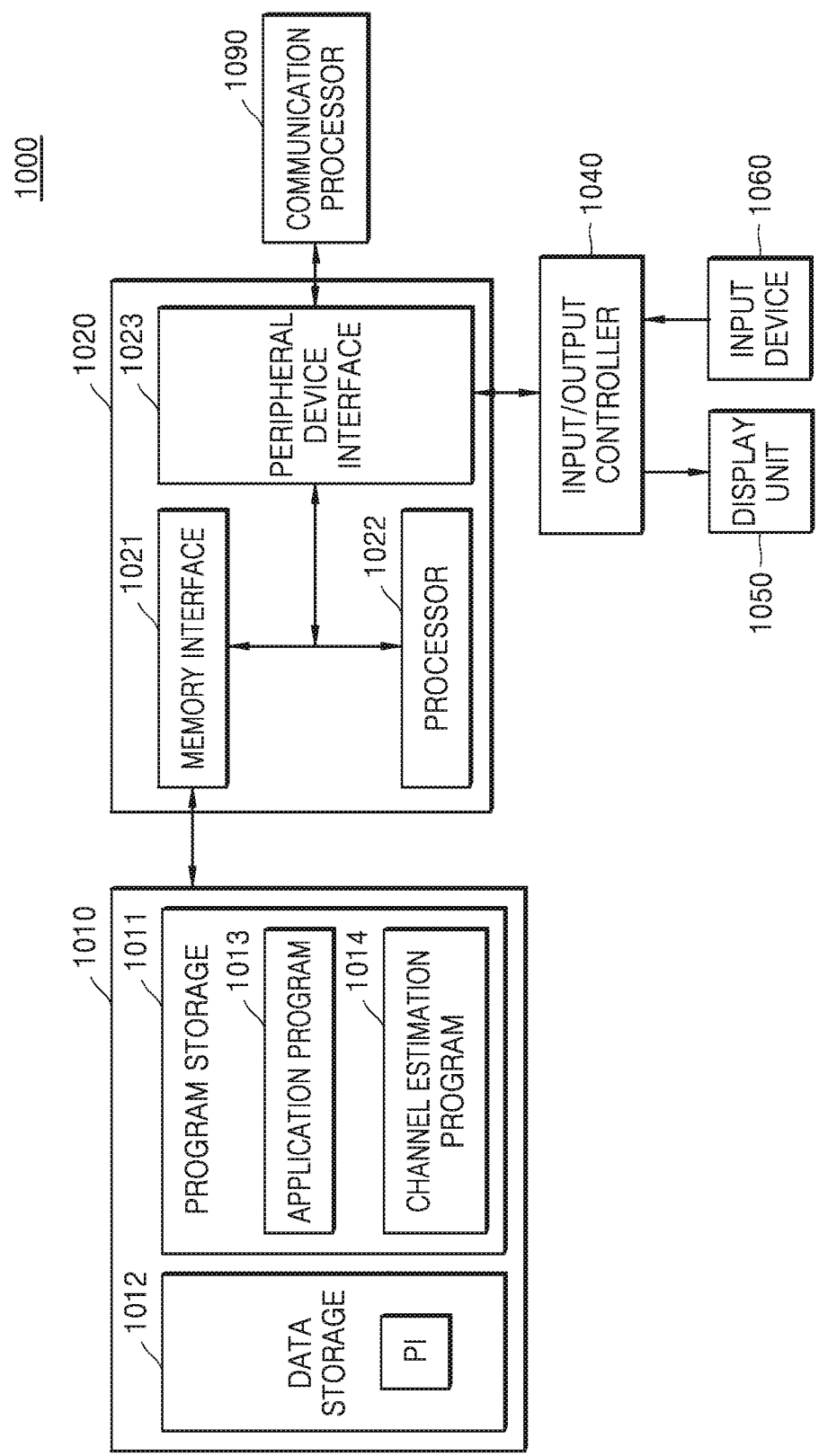
FIG. 18 is a block diagram of an electronic apparatus according to an example embodiment.

FIG. 18 is a block diagram of an electronic apparatus 1000 according to an example embodiment.

Referring to FIG. 18, the electronic apparatus 1000 may include a memory 1010, a processor unit 1020, an input/output controller 1040, a display unit 1050, an input device 1060, and a communication processor 1090. There may be a plurality of memories 1010. Each element will be described below.

The memory 1010 may include a program storage 1011, which stores a program for controlling an operation of the electronic apparatus 1000, and a data storage 1012, which stores data generated during execution of the program. The data storage 1012 may store data used for the operation of an application program 1013 and the operation of a channel estimation program 1014. In an example embodiment, the data storage 1012 may store performance information (PI) of the electronic apparatus 1000 to allow a BS to perform resource allocation according to example embodiments.

The program storage 1011 may include the application program 1013 and the channel estimation program 1014. Then, a program included in the program storage 1011 may be a set of instructions and expressed as an instruction set. The application program 1013 may include program code for executing various applications run by the electronic apparatus 1000. In other words, the application program 1013 may include code (or commands) related to various applications run by the processor 1022. The channel estimation program 1014 may include control code for performing channel estimation, taking into account a punctured reference signal pattern, according to example embodiments. In an example embodiment, the processor 1022 may estimate a control channel, taking into account a punctured reference signal pattern, by executing the channel estimation program 1014.

The communication processor 1090 of the electronic apparatus 1000 may perform communication functions for voice communication and data communication. The processor 1022 may receive an NR PDCCH from a BS through the communication processor 1090.

A peripheral device interface 1023 may control connection among the input/output controller 1040, the communication processor 1090, the processor 1022, and a memory interface 1021. The processor 1022 may control a plurality of BSs to provide a service using at least one software program. Therefore, the processor 1022 may execute at least one program stored in the memory 1010 to provide a service corresponding to the program.

The input/output controller 1040 may provide an interface between an input/output device, such as the display unit 1050 or the input device 1060, and the peripheral device interface 1023. The display unit 1050 displays status information, input text, a moving picture, and/or a still picture. For example, the display unit 1050 may display information about an application program run by the processor 1022.

The input device 1060 may provide input data, which is generated by the selection of the electronic apparatus 1000, to the processor unit 1020 through the input/output controller 1040. Then, the input device 1060 may include a keypad, which includes at least one hardware button, and/or a touch pad sensing touch information. For example, the input device 1060 may provide touch information, such as a touch, a movement of the touch, or the release of the touch, which is detected through a touch pad, to the processor 1022 through the input/output controller 1040.

Figure 19:
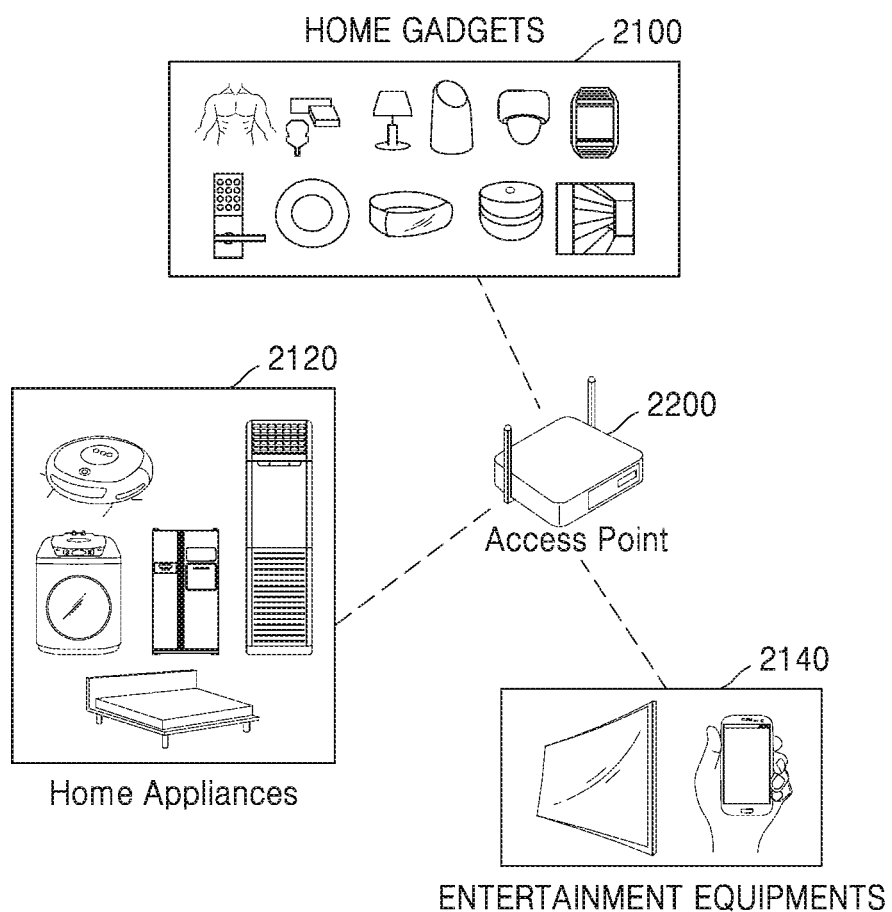
FIG. 19 is a diagram of communication equipment performing allocation of the resources of a control channel or channel estimation, according to an example embodiment.

FIG. 19 is a diagram of communication equipment performing allocation of the resources of a control channel or channel estimation, according to an example embodiment.

Referring to FIG. 19, home gadgets 2100, home appliances 2120, entertainment equipment 2140, and an access point (AP) 2200 may perform resource allocation or channel estimation on a control channel, according to embodiments. In some embodiments, the home gadgets 2100, the home appliances 2120, the entertainment equipment 2140, and the AP 2200 may constitute an Internet of things (IoT) network. The communication equipment illustrated in FIG. 19 are just examples, and example embodiments may also applied to other communication equipment than those illustrated in FIG. 19.

While the inventive concept has been particularly shown and described with reference to embodiments thereof, it will be understood that various changes in form and details may be made therein without departing from the spirit and scope of the following claims.

What is claimed is:

1. A wireless communication system comprising:
a base station configured to support dynamic spectrum sharing (DSS) between a first network and a second network; and
a user equipment configured to communicate with the base station based on the first network,
wherein the base station is further configured to puncture allocation of a first reference signal when performing resource allocation on a first control channel and when a first resource to be allocated to the first reference signal corresponding to the first network overlaps with a second resource allocated to a second reference signal corresponding to the second network, and
wherein the user equipment is further configured to receive the first control channel and perform channel estimation for the first network based on the allocation of the first reference signal that has been punctured,
wherein the base station is further configured to allow at least two time-frequency domains among a plurality of time-frequency domains to overlap with a time-frequency domain allocated to the first control channel of the first network when performing the resource allocation, the plurality of time-frequency domains respectively corresponding to a plurality of carriers of the second network,
wherein the base station is further configured to puncture the first reference signal on the at least two time-frequency domains according to a same first puncturing pattern when performing the resource allocation, and
wherein the base station is further configured to allocate, according to a second puncturing pattern, the first reference signal to a time-frequency domain of a guard band between the at least two time-frequency domains.

2. The wireless communication system of claim 1, wherein:
the first network includes a new radio (NR) network,
the second network includes a long-term evolution (LTE) network,
the first reference signal includes a demodulation reference signal (DMRS), and
the second reference signal includes a cell reference signal (CRS).

3. The wireless communication system of claim 1, wherein the base station is further configured to allow one time-frequency domain among a plurality of time-frequency domains to overlap with a time-frequency domain allocated to the first control channel of the first network when performing the resource allocation, the plurality of time-frequency domains respectively corresponding to a plurality of carriers of the second network.

4. The wireless communication system of claim 1, wherein the user equipment is further configured to perform the channel estimation using the second puncturing pattern of the first reference signal allocated to the time-frequency domain of the guard band.

5. The wireless communication system of claim 1, wherein the user equipment is further configured to perform the channel estimation using a portion of the second puncturing pattern of the first reference signal allocated to the time-frequency domain of the guard band, excluding the first puncturing pattern.

6. The wireless communication system of claim 1, wherein the base station is further configured to allocate the first reference signal to some resources among a plurality of consecutive resources on a time axis, the some resources being expected not to overlap with the second resource allocated to the second reference signal, and puncture allocation of the first reference signal in a remaining resource expected to overlap with the second resource allocated to the second reference signal.

7. The wireless communication system of claim 6, wherein the user equipment is further configured not to use the first reference signal allocated to the some resources, based on the puncture allocation of the first reference signal being punctured as in the remaining resource, when performing the channel estimation.

8. The wireless communication system of claim 1, wherein, when a demodulation reference signal (DMRS) precoding unit of a second control channel is set to a second control channel allocation region, the base station is further configured to perform resource allocation on the second control channel such that the second resource allocated to the second reference signal does not overlap with the first resource to be allocated to the first reference signal; and
wherein the user equipment is further configured to receive the second control channel and perform the channel estimation for the first network, taking into account that the first reference signal is not punctured.

9. The wireless communication system of claim 1, wherein, when a plurality of second reference signal rate matching patterns applicable to a frequency domain corresponding to a certain carrier are set for resource allocation on a second control channel, the base station is further configured to perform the resource allocation on the second control channel such that the second resource allocated to the second reference signal does not overlap with the first resource to be allocated to the first reference signal; and
wherein the user equipment is further configured to receive the second control channel and perform the channel estimation for the first network based on the first reference signal not being punctured.

10. The wireless communication system of claim 1, wherein the base station is further configured to perform the resource allocation on the first control channel based on a number of supported punctured first reference signal patterns the user equipment supports.

11. The wireless communication system of claim 10, wherein the user equipment is further configured to transmit the number of supported punctured first reference signal patterns to the base station via radio resource control (RRC) signaling.

12. An operating method of a base station supporting dynamic spectrum sharing (DSS) between a first network and a second network, the operating method comprising:
determining, based on communication settings, that a first resource element is allocated to a first reference signal corresponding to the first network and to a second reference signal corresponding to the second network; and
performing resource allocation on a control channel with a puncture of allocation of the first resource to the first reference signal in response to the determination.

13. The operating method of claim 12, wherein determining whether to allow the overlap comprises determining not to allow the overlap when a demodulation reference signal (DMRS) precoding unit of the control channel is set to a control channel allocation region in the communication settings, and
wherein performing resource allocation on the control channel comprises allocating the first reference signal to a different resource than the second resource allocated to the second reference signal in response to the determination not to allow the overlap.

14. The operating method of claim 12, wherein determining whether to allow the overlap comprises determining not to allow the overlap when a plurality of second reference signal rate matching patterns applicable to a frequency domain corresponding to a certain carrier are set in the communication settings; and
wherein performing resource allocation on the control channel comprises allocating different resources to the first reference signal and the second reference signal, respectively, in response to the determination not to allow the overlap.

15. A wireless communication system comprising:
a base station configured to support dynamic spectrum sharing (DSS) between a first network and a second network; and
a user equipment configured to communicate with the base station based on the first network,
wherein the base station is further configured to puncture allocation of a first reference signal when performing resource allocation on a first control channel and when a first resource to be allocated to the first reference signal corresponding to the first network overlaps with a second resource allocated to a second reference signal corresponding to the second network, and
wherein the user equipment is further configured to receive the first control channel and perform channel estimation for the first network based on the allocation of the first reference signal that has been punctured,
wherein the base station is further configured to perform the resource allocation on the first control channel based on a number of supported punctured first reference signal patterns the user equipment supports.

* * * * *